United States Patent
Chae et al.

(10) Patent No.: US 11,251,887 B2
(45) Date of Patent: Feb. 15, 2022

(54) SIGNAL STRENGTH BAND-BASED DEVICE MANAGEMENT METHOD AND ELECTRONIC DEVICE THEREFOR

(71) Applicant: Samsung Electronics Co., Ltd., Suwon-si (KR)

(72) Inventors: Beomseok Chae, Suwon-si (KR); Eunji Choi, Suwon-si (KR); Sam Lim, Suwon-si (KR); Gilhong Min, Suwon-si (KR); Miseon Hwang, Suwon-si (KR); Donggyu Park, Suwon-si (KR); Sunkey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/970,328

(22) PCT Filed: Feb. 14, 2019

(86) PCT No.: PCT/KR2019/001827
§ 371 (c)(1),
(2) Date: Aug. 14, 2020

(87) PCT Pub. No.: WO2019/160356
PCT Pub. Date: Aug. 22, 2019

(65) Prior Publication Data
US 2021/0083784 A1 Mar. 18, 2021

(30) Foreign Application Priority Data
Feb. 14, 2018 (KR) .................. 10-2018-0018110

(51) Int. Cl.
H04B 7/00 (2006.01)
H04B 17/318 (2015.01)
(Continued)

(52) U.S. Cl.
CPC ............ *H04B 17/318* (2015.01); *H04W 4/80* (2018.02); *H04W 24/08* (2013.01); *H04W 52/245* (2013.01)

(58) Field of Classification Search
CPC ...... H04B 17/318; H04W 4/80; H04W 24/08; H04W 52/245
(Continued)

(56) References Cited

U.S. PATENT DOCUMENTS 9,564,999 B2 * 2/2017 Kim ..................... H04L 5/0023
9,675,051 B2 * 6/2017 Bonge, Jr. .............. A01K 15/02
(Continued)

FOREIGN PATENT DOCUMENTS

KR 10-2008-0073028 A 8/2008
KR 10-2014-0001343 A 1/2014
(Continued)

OTHER PUBLICATIONS

International Search Report dated Jun. 11, 2019 in connection with International Patent Application No. PCT/KR2019/001827, 2 pages.

*Primary Examiner* — April G Gonzales

(57) ABSTRACT

Disclosed, according to various embodiments, is an electronic device comprising at least one communication circuit and a processor. The processor may be configured so that, by means of the at least one communication circuit, the processor receives, from an external electronic device, a first signal including first response time information and first signal strength information of a first signal strength band, and determines whether the reception power of the first signal corresponds to the first signal strength information, and if the reception power of the first signal corresponds to the first signal strength information, transmits information of the electronic device to the external electronic device on the basis of the first response time information. In addition,
(Continued)

various embodiments are possible as identified in the specification.

14 Claims, 17 Drawing Sheets

(51) Int. Cl.
*H04W 4/80* (2018.01)
*H04W 24/08* (2009.01)
*H04W 52/24* (2009.01)

(58) Field of Classification Search
USPC .......................................................... 455/41.2
See application file for complete search history.

(56) References Cited

U.S. PATENT DOCUMENTS

| | | | |
|---|---|---|---|
| 9,781,578 B2* | 10/2017 | Kim | H04W 4/08 |
| 9,992,746 B2* | 6/2018 | Merlin | H04L 27/2601 |
| 10,485,011 B2* | 11/2019 | Soldati | H04W 72/082 |
| 2011/0243025 A1* | 10/2011 | Kim | H04L 5/006 370/252 |
| 2014/0106686 A1* | 4/2014 | Higgins | H04L 5/16 455/78 |
| 2015/0139015 A1* | 5/2015 | Kadous | H04W 36/00837 370/252 |
| 2016/0119881 A1* | 4/2016 | Merlin | H04W 52/10 370/328 |
| 2017/0118604 A1* | 4/2017 | Kim | H04L 5/0023 |
| 2018/0027391 A1* | 1/2018 | Kim | H04L 5/006 370/312 |
| 2018/0255517 A1* | 9/2018 | Merlin | H04W 52/10 |
| 2019/0037418 A1* | 1/2019 | Gunasekara | H04W 52/245 |
| 2019/0159052 A1* | 5/2019 | Wolcott | H04W 4/80 |

FOREIGN PATENT DOCUMENTS

| | | |
|---|---|---|
| KR | 10-2016-0052657 A | 5/2016 |
| KR | 10-2017-0091811 A | 8/2017 |
| KR | 10-1827713 B1 | 2/2018 |

* cited by examiner

SIGNAL STRENGTH BAND-BASED DEVICE MANAGEMENT METHOD AND ELECTRONIC DEVICE THEREFOR

CROSS-REFERENCE TO RELATED APPLICATIONS

This application is a 371 of International Application No. PCT/KR2019/001827 filed on Feb. 14, 2019, which claims priority to Korean Patent Application No. 10-2018-0018110 filed on Feb. 14, 2018, the disclosures of which are herein incorporated by reference in their entirety.

BACKGROUND

1. Field

Various embodiments disclosed in this specification relate to a method for managing devices based on a signal strength band and an electronic device therefor.

2. Description of Related Art

Various electronic devices may have connectivity based on various wireless protocols (e.g., Bluetooth, Bluetooth low energy (BLE), or Wi-Fi). As the number of electronic devices having connectivity increases, methods for connecting and/or managing various electronic devices have been studied.

An electronic device may execute various services by transmitting a periodic beacon signal. For example, the electronic device may determine the locations of adjacent electronic devices, using Bluetooth beacon signals. An external electronic device receiving the beacon signal from the electronic device may perform a service based on the service information included in the beacon signal.

An electronic device may generate a wireless connection with an external electronic device, using a technology such as a Bluetooth beacon. For the electronic device to generate and maintain the wireless connection with the external electronic device, time and radio resources may be consumed. Accordingly, there may be a need for a method that enables an electronic device to collect data associated with an external electronic device or to perform any service on the external electronic device without generating a connection with the external electronic device. Besides, when a plurality of external electronic devices are present around the electronic device, a method for scheduling transmission between electronic devices may be required.

Various embodiments disclosed in the specification provide a method and electronic device for collecting information from a plurality of external electronic devices, and tracking and managing the plurality of external electronic devices.

SUMMARY

According to an embodiment disclosed in this specification, an electronic device may include at least one communication circuit for transmit and receive a wireless signal and a control circuit operatively connected to the at least one wireless communication circuit. The control circuit may be configured to transmit a first signal including first information indicating a first signal strength range during a first time interval through the at least one wireless communication circuit, to receive at least one second signal including second information associated with the at least one first external device from at least one first external device during second time interval through the at least one wireless communication circuit, to transmit a third signal including third information indicating a second signal strength range different from the first signal strength range during a third time interval through the at least one wireless communication circuit, and to receive at least one fourth signal including fourth information associated with the at least one second external device from at least one second external device during a fourth time interval through the at least one wireless communication circuit.

Furthermore, according to an embodiment disclosed in this specification, an electronic device may include at least one communication circuit and a processor for controlling the at least one communication circuit. The processor may be configured to transmit a first signal including first signal strength information and first response time information of a first signal strength band among a plurality of signal strength bands, using the at least one communication circuit and to receive at least one second signal including information of at least one first external electronic device from the at least one first external electronic device corresponding to the first signal strength information, using the at least one communication circuit.

Moreover, according to an embodiment disclosed in this specification, an electronic device may include at least one communication circuit and a processor for controlling the at least one communication circuit. The processor may be configured to receive a first signal including first signal strength information and first response time information of a first signal strength band from an external electronic device, using the at least one communication circuit, to determine whether reception power of the first signal corresponds to the first signal strength information, and to transmit information of the electronic device to the external electronic device based on the first response time information when the reception power of the first signal corresponds to the first signal strength information.

According to various embodiments disclosed in the specification, the electronic device may schedule signal transmission from various external electronic devices based on a signal strength band.

Furthermore, according to various embodiments, the electronic device may reduce interference by controlling the signal emission timing of various electronic devices.

Besides, a variety of effects directly or indirectly understood through the disclosure may be provided.

BRIEF DESCRIPTION OF THE DRAWINGS

With regard to description of drawings, the same or similar components may be marked by the same or similar reference numerals.

DETAILED DESCRIPTION

Hereinafter, various embodiments of this specification may be described with reference to accompanying drawings. Embodiments and terms used herein are not intended to limit the technologies described in the disclosure to specific embodiments, and it should be understood that the embodiments and the terms include modification, equivalent, and/or alternative on the corresponding embodiments described herein.

Figure 1:
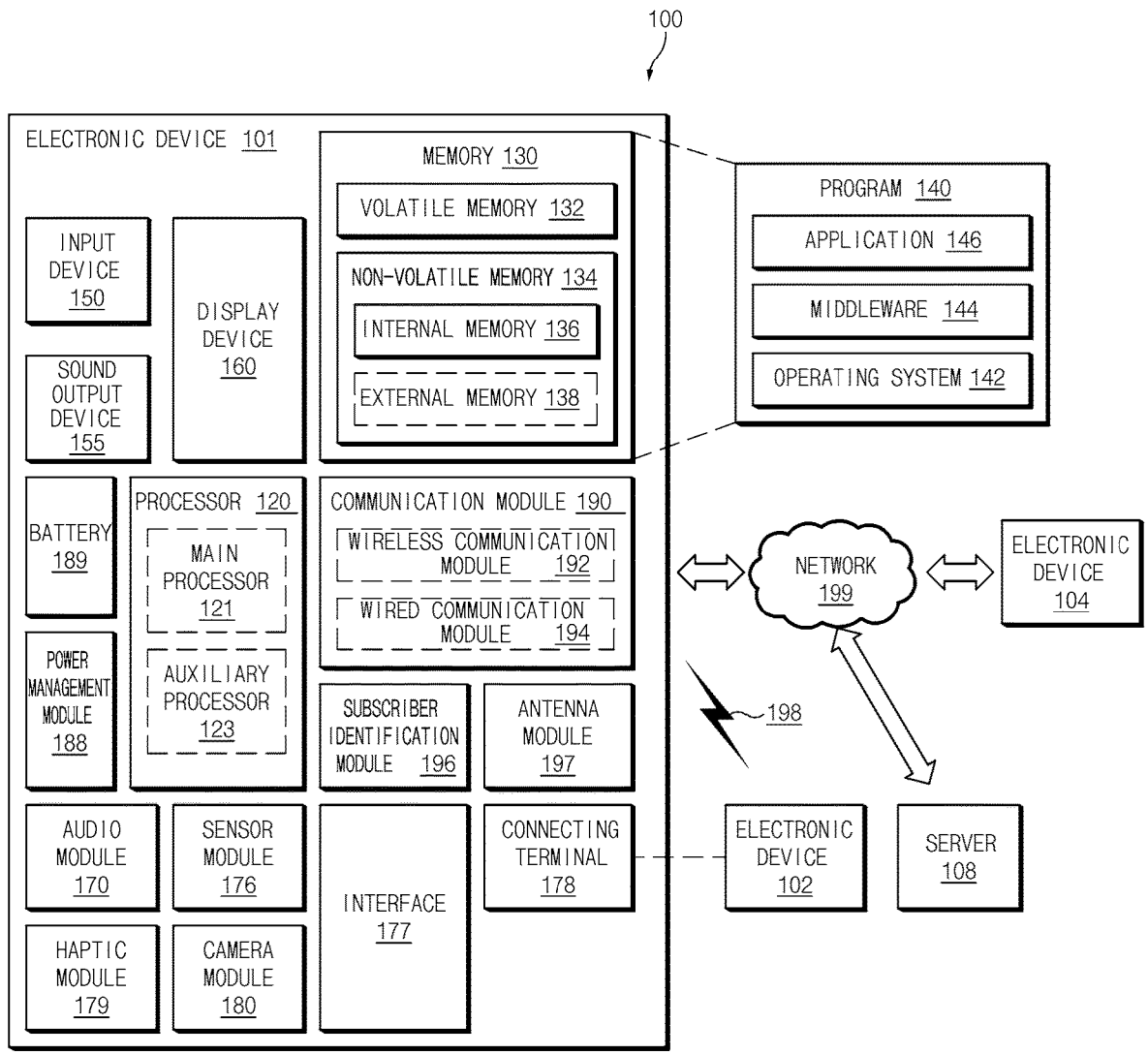
FIG. 1 illustrates a block diagram of the electronic device in a network, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
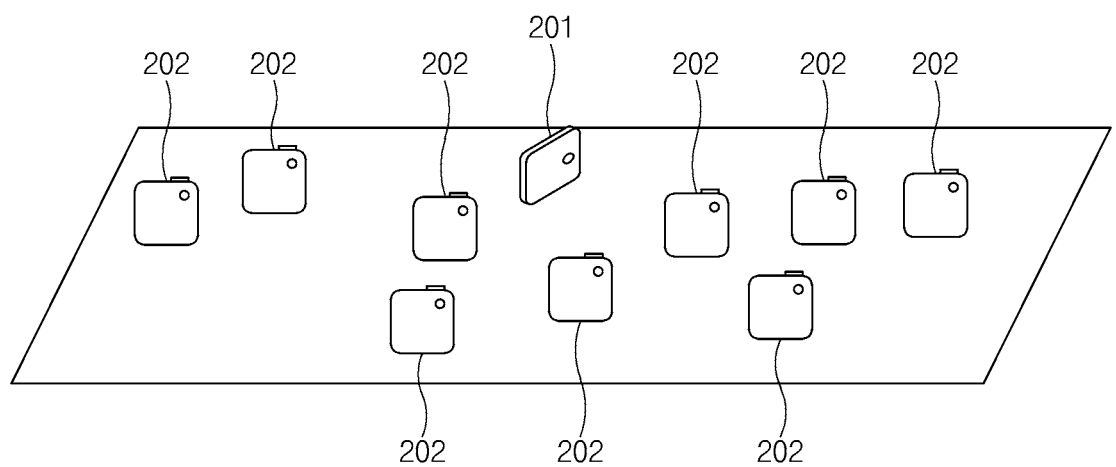
FIG. 2 illustrates a placement of electronic devices according to various embodiments.

FIG. 2 illustrates a placement of electronic devices according to various embodiments.

According to various embodiments, an electronic device 201 (e.g., the electronic device 101 in FIG. 1) and a plurality of external electronic devices 202 (e.g., the electronic device 102 in FIG. 1) in a single space (e.g., one floor of the building) may be positioned. For example, the electronic device 201 may be a device for searching for and managing the plurality of external electronic devices 202. For example, the external electronic device 202 may include a sensor device (e.g., an illuminometer, a hygrometer, a thermometer, a noise meter, and/or a barometer), an input device (e.g., a voice receiving device, a biometric information recognition device, and/or a user input receiving device), and/or an output device (e.g., a printer, an audio device, an actuator, and/or a display device). For example, the external electronic device 202 may be any device (e.g., a smart phone and/or a vehicle) that has connectivity with other electronic devices.

According to various embodiments, the electronic device 201 may be configured to scan the external electronic device 202 positioned in a specific range or a specified range (e.g., a building, a floor, or a region of a specific range). According to an embodiment, the electronic device 201 may scan the external electronic device 202 based on a wireless protocol (e.g., Bluetooth, BLE, Wi-Fi, ZigBee, neighborhood area network (NAN), near field communication (NFC), and/or wired protocol (e.g., universal serial bus (USB)). For example, the electronic device 201 may scan the external electronic device 202 by receiving the signal generated by the external electronic device 202. As illustrated in FIG. 2, when there are a large number of the external electronic devices 202 within a specific region, collisions may also occur between signals transmitted by the external electronic devices 202. According to an embodiment, the electronic device 201 may reduce the collisions by scheduling signal transmission of the external electronic device 202.

Figure 3:
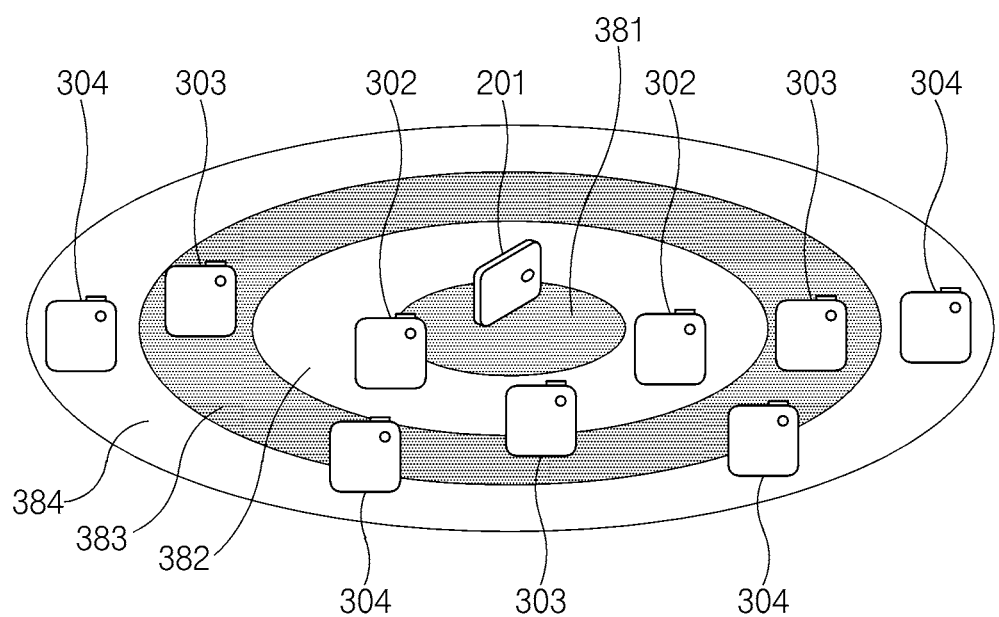
FIG. 3 illustrates examples of signal strength bands according to various embodiments.

FIG. 3 illustrates examples of signal strength bands according to various embodiments.

According to various embodiments, the electronic device 201 may scan an external electronic device by dividing the external electronic device (e.g., the external electronic device 202 in FIG. 2) into a plurality of bands. For example, the electronic device 201 may set a first band 381, a second band 382, a third band 383, and a fourth band 384 with the center at the electronic device 201. Referring to FIG. 3, for example, two second asset devices 302 (e.g., the external electronic device 202) may be located in the second band 382; three third asset devices 303 (e.g., the external electronic device 202) may be located in the third band 383; four fourth asset devices 304 (e.g., the external electronic device 202) may be located in the fourth band 384.

According to various embodiments, the electronic device 201 may set the bands 381 to 384 based on signal strength (e.g., received signal strength indicator (RSSI)). According to another embodiment, the bands 381 to 384 may be set in advance. According to another embodiment, the electronic device 201 may adjust the set band based on signal strength. For example, the first band 381 may correspond to a range in which the received signal strength is 0 dBm or more and −50 dBm or less from the transmitted signal strength. For example, the second band 382 may correspond to a range in which the received signal strength is −50 dBm or more and −60 dBm or less from the transmitted signal strength. For example, the third band 383 may correspond to a range in which the received signal strength is −60 dBm or more and −70 dBm or less from the transmitted signal strength. For example, the fourth band 384 may correspond to a range in which the received signal strength is −70 dBm or more and −80 dBm or less from the transmitted signal strength.

According to various embodiments, the electronic device 201 may transmit (e.g., advertise or broadcast) a message including information including signal strength band information and transmission time interval information. For example, a message including information including signal strength band information and transmission time interval information may be transmitted through a beacon signal. For example, information including signal strength band information and transmission time interval information may be referred to as a "token". For example, the electronic device 201 may advertise or broadcast the token, using an advertisement packet data unit (PDU) of Bluetooth or BLE protocol.

According to an embodiment, the electronic device 201 may advertise or broadcast a message including a service identifier (e.g., universally unique identifier (UUID)). For example, the service identifier may indicate that the corresponding packet is for the management services of the asset devices 302 to 304.

According to an embodiment, the electronic device 201 may advertise or broadcast a message including the identifier of the electronic device 201.

According to an embodiment, the electronic device 201 may transmit a first message including information indicating the transmission power of the message.

According to an embodiment, the electronic device 201 may advertise or broadcast a message including service type information. For example, the service type information may include information indicating the transmission purpose (e.g., token transmission, on-demand, device management agent association, or device agent association)

According to an embodiment, the token included in the message may include information indicating the band (e.g., information indicating the upper and lower limits of a band) and information indicating the length of a time interval for transmitting a response signal.

According to various embodiments, the electronic device 201 may advertise or broadcast a message based on a specified period, a user input, and/or a signal from an external electronic device.

According to various embodiments, after the electronic device 201 may broadcast or advertise a message including a token for a single band for each band, and then may monitor a response signal (e.g., a beacon signal) from the at least one asset device 302, 303, or 304 corresponding to each band. For example, the broadcasting and monitoring of a message for one band may be referred to as scanning for one band. According to an embodiment, the electronic device 201 may scan each band until the entire specified bands are scanned. For example, the electronic device 201 may monitor a response signal during a specified time period after transmitting a message including a token for the first band 381, may monitor a response signal during a specified time period after transmitting a message including a token for the second band 382, may monitor a response signal during a specified time period after transmitting a message including a token for the third band 383, and may monitor a response signal during a specified time period after transmitting a message including a token for the fourth band 384. According to an embodiment, the monitoring time interval of scanning for each band may be different for each band. For example, the electronic device 201 may differently set a monitoring time for each band based on the distance from the electronic device 201, the number of response signals received from the plurality of external electronic devices 202, or the number of response signals previously received.

According to various embodiments, the at least one asset device 302, 303, or 304 may receive a message transmitted from the electronic device 201; the at least one asset device 302, 303, or 304 may transmit a response signal including information associated with the at least one asset device 302, 303, or 304 to the electronic device 201 based on the token included in the message. For example, when the reception strength of the message received from the electronic device 201 corresponds to the band information of the token included in the message, the at least one asset device 302, 303, or 304 may transmit a response signal including information of the at least one asset device 302, 303, or 304 to the electronic device 201 depending on the time interval information of the token. For example, the at least one asset device 302, 303, or 304 may repeatedly transmit a response signal at a specified period or the specified number of times in a time interval corresponding to the time interval information of the token.

According to an embodiment, the at least one asset device 302, 303, or 304 may transmit a response signal including identification information, type information, and/or capability information of each of the asset devices 302 to 304.

According to an embodiment, the at least one asset device 302, 303, or 304 may transmit a response signal including information about the reception strength of a message, information about angle of arrival of a message and/or information about angle of departure of the response signal.

According to an embodiment, the electronic device 201 may broadcast or advertise a message including a token corresponding to the third band 383. For example, because the reception strength of a message does not correspond to the band information included in the token, the at least one second asset device 302 and the at least one fourth asset device 304 respectively located in the second band 382 and the fourth band 384 may continue to monitor the message. For example, the at least one third asset device 303 located in the third band 383 may transmit a response signal including information of the respective third asset device 303, to the electronic device 201 depending on a time interval indicated by the token. According to an embodiment, the respective third asset device 303 may repeatedly transmit a response signal at different or identical periods from or to one another. According to an embodiment, the respective third asset device 303 may be configured to transmit a response signal after any backoff. For example, the backoff time may be determined depending on a specified function or may be determined based on the identifier of the respective third asset device 303.

The configurations of the bands 381 to 384 and at least one asset device 302, 303, or 304 illustrated in FIG. 3 are exemplary, and the configuration of the bands 381 to 384 and/or the asset devices 302 to 304 of the disclosure is not limited thereto.

Figure 4:
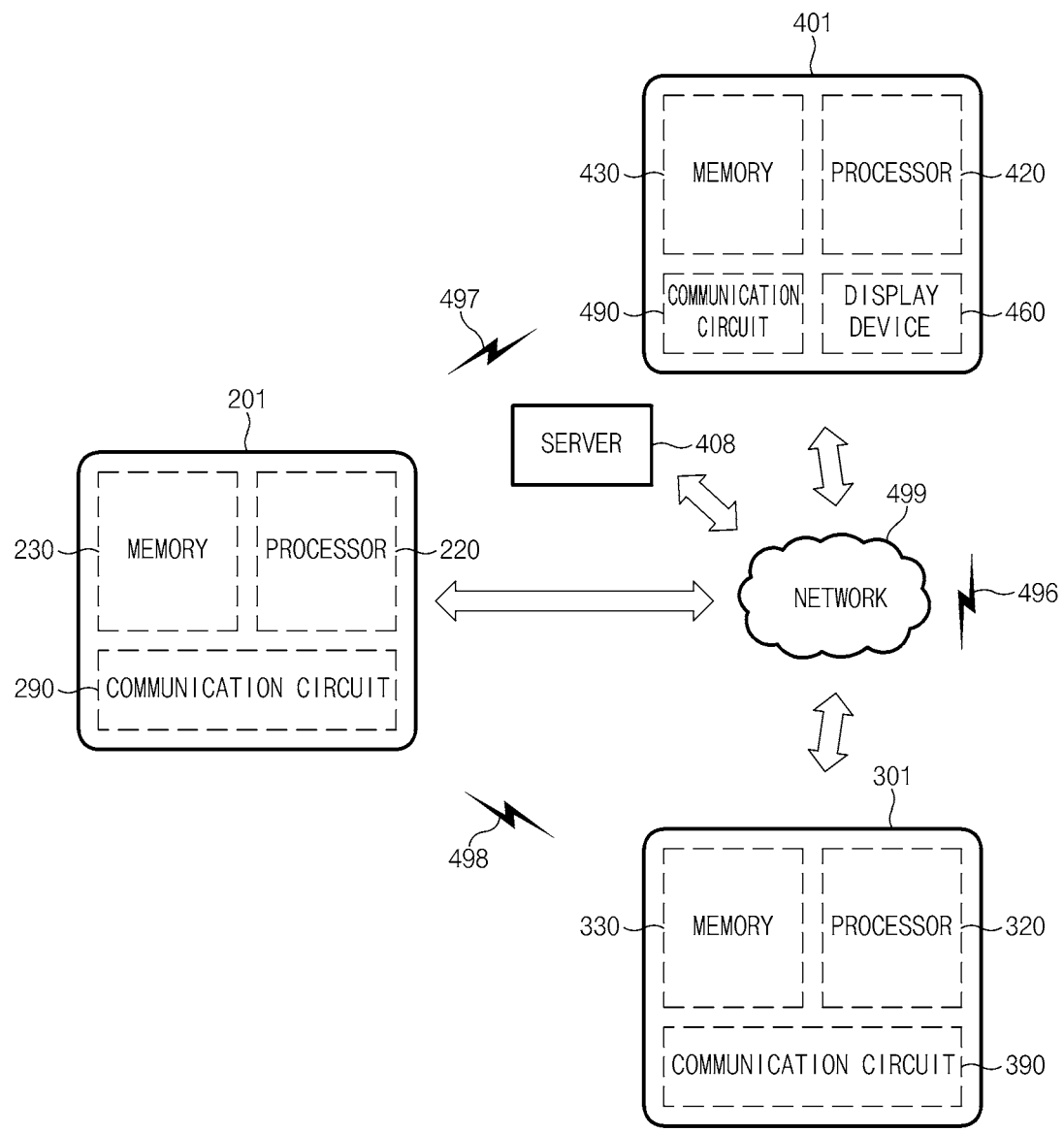
FIG. 4 illustrates a block diagram of electronic devices according to various embodiments.

FIG. 4 illustrates a block diagram of electronic devices according to various embodiments.

In the embodiment of FIG. 4, the electronic device 201, the asset device 301 (e.g., the asset device 302, 303, or 304 in FIG. 2), and an external electronic device 401 may include the configurations identical or similar to the configurations of the electronic device 101 of FIG. 1. According to an embodiment, the external electronic device 401 may be omitted.

Referring to FIG. 4, according to an embodiment, the electronic device 201 may communicate with the external electronic device 401 through a network 497 (e.g., the first network 198 or the second network 198) and may communicate with the asset device 301 through a network 498 (e.g., the first network 198 or the second network 198). For example, the network 497 may include at least one of Bluetooth, BLE, Wi-Fi, ZigBee, NAN, or NFC. For example, the electronic device 201 may include a fixed power source or a high capacity battery. For example, the electronic device 201 may be an electronic device having the fixed location. For example, the electronic device 201 may be referred to as a scanner, a management agent, or a hub device.

According to an embodiment, the electronic device 201 may transmit information associated with the asset device 301 to a server 408 (e.g., the server 108 of FIG. 1) through a network 499 (e.g., the second network 199) or may receive information associated with the asset device 301 from the server 408.

According to an embodiment, the electronic device 201 may operate in conjunction with another external electronic device (not illustrated). For example, the electronic device 201 may track and/or manage the asset device 301 through operating in conjunction with another external electronic device (not illustrated) different from the electronic device 201. According to an embodiment, the electronic device 201 and/or server 408 may track and manage the asset device 301 through a crowd sourcing method based on information from various external electronic devices. For example, another external electronic device (not illustrated) may be a device having mobility.

According to an embodiment, the electronic device 201 may include a processor 220, a memory 230, and a communication circuit 290. For example, processor 220 may be electrically connected to the memory 230, the communication circuit 290, and other configurations not illustrated in FIG. 4.

The configuration of the electronic device 201 illustrated in FIG. 4 is exemplary, and the configuration of the electronic device 201 is not limited thereto. According to an embodiment, the electronic device 201 may include a display device (e.g., the display device 160 in FIG. 1) and/or a user input interface. For example, the electronic device 201 may receive an input for setting the electronic device 201, may receive an input for connecting the electronic device 201 to the server 408 or the external electronic device 401, or may receive an input for registering the asset device 301.

According to an embodiment, the asset device 301 may include a sensor device (e.g., an illuminometer, a hygrometer, a thermometer, a noise meter, and/or a barometer), an input device (e.g., a voice receiving device, a biometric information recognition device, and/or a user input receiving device), and/or an output device (e.g., a printer, an audio device, an actuator, and/or a display device). For example, the asset device 301 may be referred to as an Internet of Things (IoT) device.

According to an embodiment, the asset device 301 may be connected to the server 408 through the network 499. For example, the asset device 301 may access the network 499 using an identifier received from the external electronic device 401 or the electronic device 201. According to another embodiment, the asset device 301 may not have the capability to access the network 499.

According to an embodiment, the asset device 301 may include a processor 320, a memory 330, and a communication circuit 390. For example, processor 320 may be electrically connected to the memory 330, the communication circuit 390, and other configurations not illustrated in FIG. 4. The configuration of the asset device 301 illustrated in FIG. 4 is exemplary, and the configuration of the asset device 301 is not limited thereto.

According to an embodiment, the external electronic device 401 may communicate with the electronic device 201 and the server 408. For example, the external electronic device 401 may receive information associated with the asset device 301 from the electronic device 201 or may manage the asset device 301, using the electronic device 201. For example, the external electronic device 401 may receive information associated with the asset device 301 from the server 408 or may manage the asset device 301 through the server 408. For example, the external electronic device 401 may manage the asset device and/or the electronic device 201 based on an account (e.g., Samsung account). For example, the external electronic device 401 may manage the asset device and/or the electronic device 201, using an application (e.g., Samsung Connect™ or plug-in of Samsung Connect™).

For example, the external electronic device 401 may be referred to as a terminal, user equipment (UE), a mobile station, a subscriber station, a remote terminal, a wireless terminal, a user device, or another term having the equivalent technical meaning.

According to an embodiment, the external electronic device 401 may include a processor 420, a memory 430, a display device 460, and a communication circuit 490. For example, the processor 420 may be electrically connected to the memory 430, the display device 460, the communication circuit 490, and other configurations not illustrated in FIG. 4. The configuration of the external electronic device 401 of FIG. 4 is exemplary, and the external electronic device 401 may further include other configurations not illustrated in FIG. 4.

According to an embodiment, the server 408 may be configured to process a request associated with the asset device 301 and/or the electronic device 201. According to an embodiment, the server 408 may include a database storing information (e.g., identification information and/or status information) associated with the asset device 301, the electronic device 201, and/or the external electronic device 401. For example, server 408 may be a server associated with Samsung Connect™. For example, the server 408 may be a work with smart things cloud (WWST cloud) server (e.g., an IoT cloud server).

According to various embodiments, the server 408 may store information associated with at least one asset device 301. According to an embodiment, the server 408 may include a database including account information associated with the external electronic device 401. For example, the account information may be associated with a plurality of asset devices 301. According to an embodiment, the server 408 may include a database including information of the asset devices 301 associated with the electronic device 201.

According to an embodiment, the server 408 may determine the location of the asset device 301 and/or the electronic device 201, based on the information of the electronic device 201 and/or the asset device 301. For example, the server 408 may determine the location of the asset device 301 and/or the electronic device 201, by performing triangulation based on the reception strength information (e.g., RSSI) of the asset device 301 received from the electronic device 201. For example, the server 408 may correct the reception strength information, using a filter (e.g., a Kalman filter) for the reception strength information.

According to an embodiment, the server 408 may track and manage the asset device 301. For example, when the asset device 301 is not found during a specified time or longer, the notification of the absence of the asset device 301 may be provided to a device (e.g., the electronic device 201 and/or the external electronic device 401) managing the asset device 301.

In the embodiment of FIG. 4, a network 496, the network 497, and the network 498 may be networks based on the same or different wireless protocols.

Figure 5:
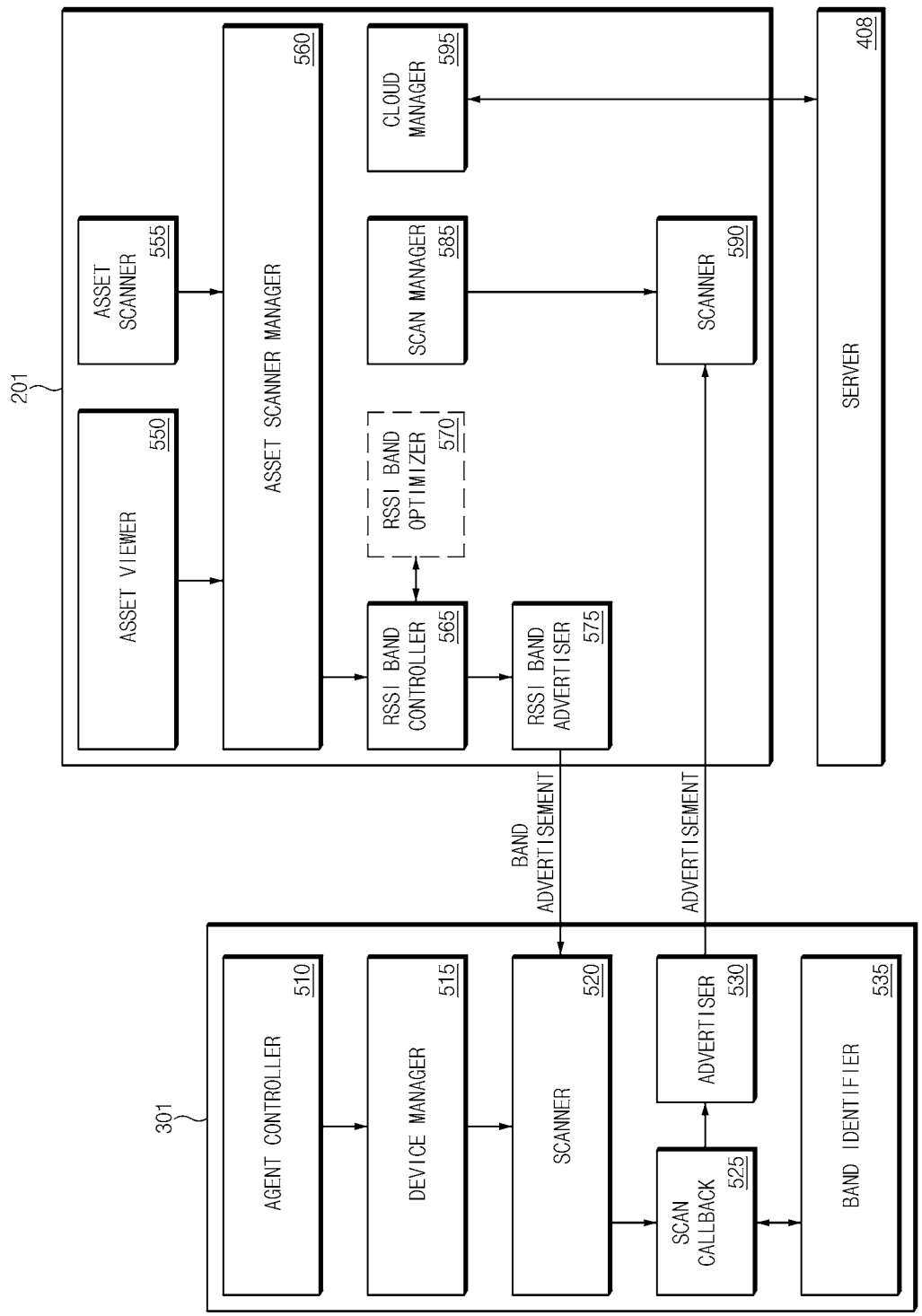
FIG. 5 illustrates a software structure of an asset device and an electronic device according to various embodiments.

FIG. 5 illustrates a software structure of an asset device and an electronic device according to various embodiments.

Referring to FIG. 5, according to various embodiments, the asset device 301 may include an agent controller 510 as a user interface. For example, the agent controller 510 may deliver a signal for activating or deactivating the advertisement or broadcasting of information about the asset device 301 to a device manager 515. For example, a user input may be received through the user input means located in the asset device 301; a user input may be received through an external electronic device (e.g., the external electronic device 401 of FIG. 4); alternatively, the agent controller 510 may deliver a signal for activating or deactivating the advertisement or broadcasting of information about the asset device 301 to the device manager 515 depending on the specified period.

According to various embodiments, when the signal for activating the advertisement or broadcasting of information about the asset device 301 is received from the agent controller 510, the device manager 515 may receive a band advertisement from the electronic device 201, using a scanner 520. According to an embodiment, when the received band advertisement includes a token (e.g., RSSI band information) or indicates that the received message corresponds to the band advertisement (e.g., when the service type of a message indicates a band advertisement), the scanner 520 may deliver the corresponding band advertisement or message to a scan callback 525.

According to various embodiments, the scan callback 525 may determine whether the reception strength of the band advertisement corresponds to the token included in the received band advertisement, using a band identifier 535. For example, when the reception strength of the received band advertisement corresponds to the token of the band advertisement, the scan callback 525 may transmit (e.g., broadcast or advertise) a response signal including information of the asset device 301, using an advertiser 530. For example, when the reception strength of the received band advertisement corresponds to the token of the band advertisement, the scan callback 525 may stop monitoring the band advertisement of the scanner 520.

According to various embodiments, the advertiser 530 may transmit information (e.g., serial number and/or unique number) of the asset device 301 at a specified period during a time period corresponding to a time interval included in the token.

According to various embodiments, the electronic device 201 may include an asset viewer 550 and an asset scanner 555, which correspond to the user interface. For example, the asset viewer 550 may be performed in response to an asset inquiry input, and the asset scanner 555 may be performed based on the asset scan input or specified period. According to an embodiment, the asset viewer 550 and/or the asset scanner 555 may be implemented in the electronic device 201. According to another embodiment, the asset viewer 550 and/or asset scanner 555 may be an interface for receiving the corresponding input from an external electronic device (e.g., the external electronic device 401 of FIG. 4). For example, when the electronic device 201 does not include a separate user interface (e.g., an input button and/or a display) for receiving a user input, the electronic device 201 may provide a user interface through a device-to-device connection to the external electronic device 401.

According to various embodiments, an asset scanner manager 560 may receive the scanner input through the asset scanner 555; alternatively, the asset scanner manager 560 may scan the asset device 301 based on a specified period. For example, the asset scanner manager 560 may make a request for a band advertisement to an RSSI band controller 565. According to an embodiment, the RSSI band controller 565 may set an RSSI band based on various criteria or may set the RSSI band, using a specified RSSI band. For example, an RSSI band optimizer 570 may provide the optimized RSSI band to the RSSI band controller 565. An RSSI band advertiser 575 may transmit a band advertisement including time interval information and RSSI band information determined according to the RSSI band controller 565.

According to various embodiments, the asset scanner manager 560 may make a request for a scan to a scan manager 585 after the band advertisement. For example, the scan manager 585 may monitor the signal from the asset device 301 during a specified time interval, using a scanner 590.

According to various embodiments, the asset scanner manager 560 may sequentially repeat band advertisement and monitoring for each band until the scanning for all specified bands is performed. According to an embodiment, the electronic device 201 may simultaneously perform band advertisement and monitoring of a signal from the asset device 301, using the asset scanner manager 560 and the scan manager 585. For example, the electronic device 201 may simultaneously perform the band advertisement for the first band and the monitoring for the first band. For example, the electronic device 201 may simultaneously perform the band advertisement for the first band and the monitoring for a second band different from the first band. According to an embodiment, the electronic device 201 may perform band advertisement and monitoring of a signal from the asset device 301, using the asset scanner manager 560 and the scan manager 585 in at least some other time points. For example, the electronic device 201 may transmit the band advertisement for the first band during a specified time (e.g., at a specified period during a specified time) and then may perform the monitoring for the first band during a specified time.

According to various embodiments, when an asset inquiry request is received through the asset viewer 550, the asset scanner manager 560 may output information about the asset device 301, using the display device (not illustrated) of the electronic device 201 and/or the display device 460 of the external electronic device 401. For example, the asset scanner manager 560 may output information of the asset device 301 stored in the memory 230 and/or the information of the asset device 301 received from the server 408.

According to various embodiments, the asset scanner manager 560 may transmit the scanned information of the asset device 301 to the server 408 using a cloud manager 595, or may receive the information of the asset device 301 from the server 408.

For example, the above-described configurations of the electronic device 201 may be modules of an asset managing agent application. For example, the asset managing agent application may be an application on the processor 220.

The configurations of the electronic device 201 and the asset device 301 of FIG. 5 are logical configurations, and at least part of the configurations may be implemented as a single configuration. In addition, the above-described configurations are described as software configurations, but at least part of the above-described configurations may be implemented using dedicated hardware or general-purpose hardware.

Figure 6:
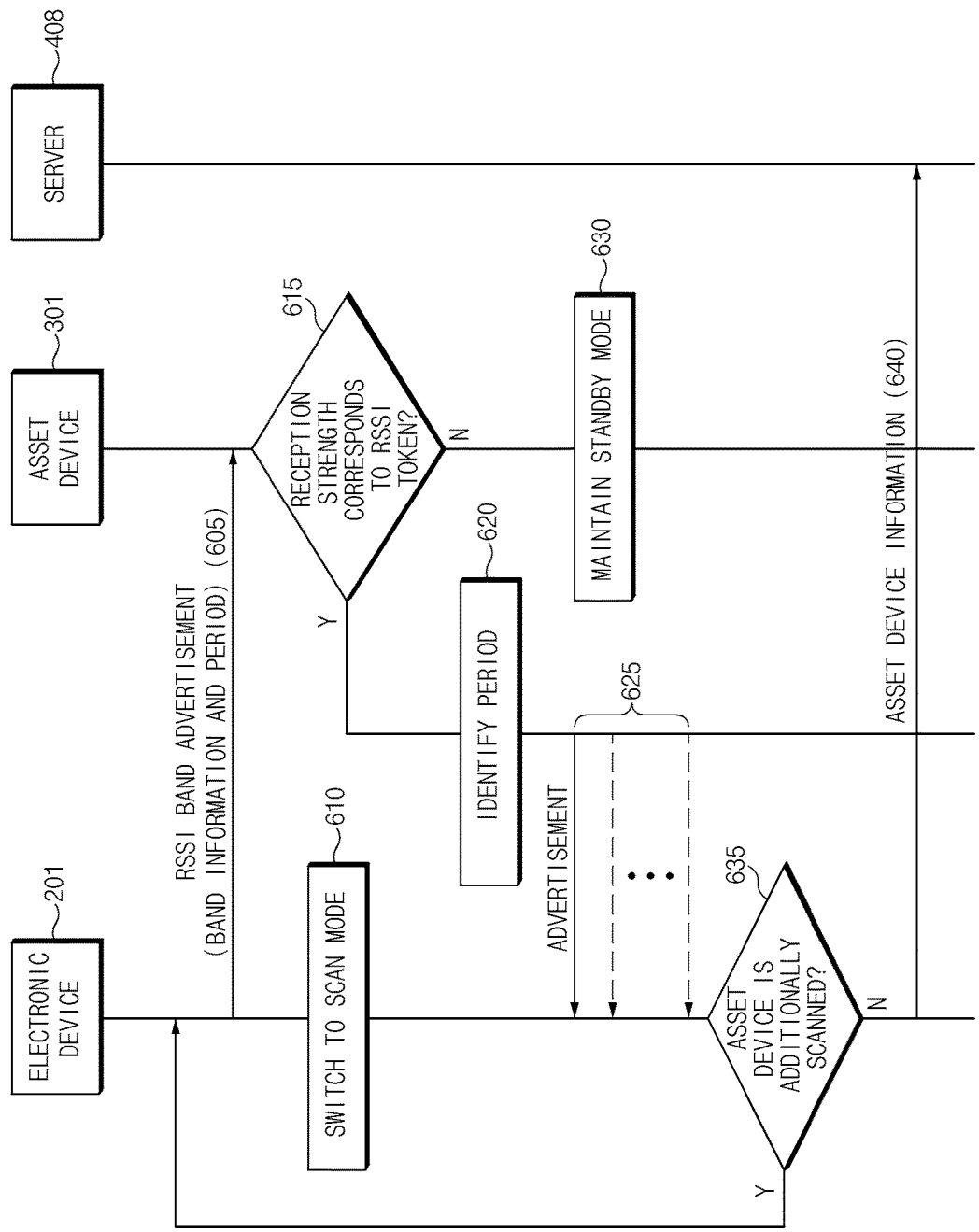
FIG. 6 is a flowchart of a scan method according to various embodiments.

FIG. 6 is a flowchart of a scan method according to various embodiments.

According to various embodiments, in operation 605, the electronic device 201 may transmit an RSSI band advertisement including band information and period information. For example, the electronic device 201 may transmit the RSSI band advertisement based on a user input, a signal from an external electronic device (e.g., the external electronic device 401 in FIG. 4), or a specified period. For example, the RSSI band advertisement may at least include band information (e.g., RSSI band information) for allowing the asset device 301 to transmit asset device information based on received signal strength and an RSSI token including period information for allowing the asset device 301 to transmit the asset device information. According to an embodiment, the electronic device 201 may repeatedly transmit an RSSI band advertisement within a specified time.

According to various embodiments, in operation 610, after the RSSI band advertisement, the electronic device 201 may switch an operating mode to a scan mode. In the scan mode, the electronic device 201 may interrupt an RSSI band advertisement and may monitor signals from other electronic devices (e.g., the asset device 301). According to an embodiment, the electronic device 201 may be switched to the scan mode during a time period longer than or equal to a time period, during which the RSSI band advertisement is advertised. For example, when performing the RSSI band advertisement during a first time interval (e.g., 1 second), the electronic device 201 may operate during a time period longer than or equal to the first time interval, in the scan mode.

According to various embodiments, in operation 615, the asset device 301 may determine whether the reception strength of the received RSSI band advertisement corresponds to an RSSI token. When the reception strength does not correspond to the RSSI token, in operation 630, the asset device 301 may maintain a standby mode. For example, the asset device 301 may continuously monitor the RSSI token corresponding to itself.

According to an embodiment, when the service type information included in the received RSSI band advertisement is an RSSI band token, the asset device 301 may determine whether the reception strength corresponds to the RSSI token, by comparing the RSSI band value of the RSSI band token included in the RSSI band advertisement with the RSSI value of the RSSI band advertisement.

According to various embodiments, in operation 620, when the reception strength corresponds to the RSSI band value of the RSSI band token, the asset device 301 may identify period information included in the RSSI token. For example, in operation 625, the asset device 301 may advertise the information of the asset device 301 based on the identified period information. For example, the asset device 301 may repeatedly advertise the information of the asset device 301 based on the period information. For example, when the information of the asset device 301 is received, the electronic device 201 may store information of the asset device 301 or may update information of the asset device 301. For example, the electronic device 201 may transmit the received information of the electronic device 301 to an external electronic device.

According to various embodiments, in operation 635, the electronic device 201 may determine whether to additionally scan the asset device 301, after a specific time after being switched to the scan mode depending on operation 610. According to an embodiment, the electronic device 201 may determine that scanning of the asset device 301 is completed, based on bands in which the scanning is completed. For example, when the scanning is performed on specified bands or all bands, the electronic device 201 may complete the scanning and then may transmit asset device information to the server 408 depending on operation 640. For example, the electronic device 201 may transmit the received information of the asset device 301 to the server 408 depending on operation 625. According to another embodiment, the electronic device 201 may determine that the scanning of the asset device 301 is not completed, based on bands in which the scanning is not completed. For example, the electronic device 201 may perform an RSSI band advertisement on the subsequent band in which the scanning is not performed, depending on operation 605. For example, in operation 635, when an additional scan is determined, the electronic device 653 may switch the mode of the electronic device 201 from a scan mode to an advertisement mode and then may perform the RSSI band advertisement on the subsequent band in which scanning is not performed.

With regard to operation 635, it has been described that operation 640 is performed when the additional scanning of the asset device is unnecessary. However, operation 640 may be performed whenever scanning for a specified RSSI band is completed. For example, operation 635 may be performed after operation 640.

Figure 7:
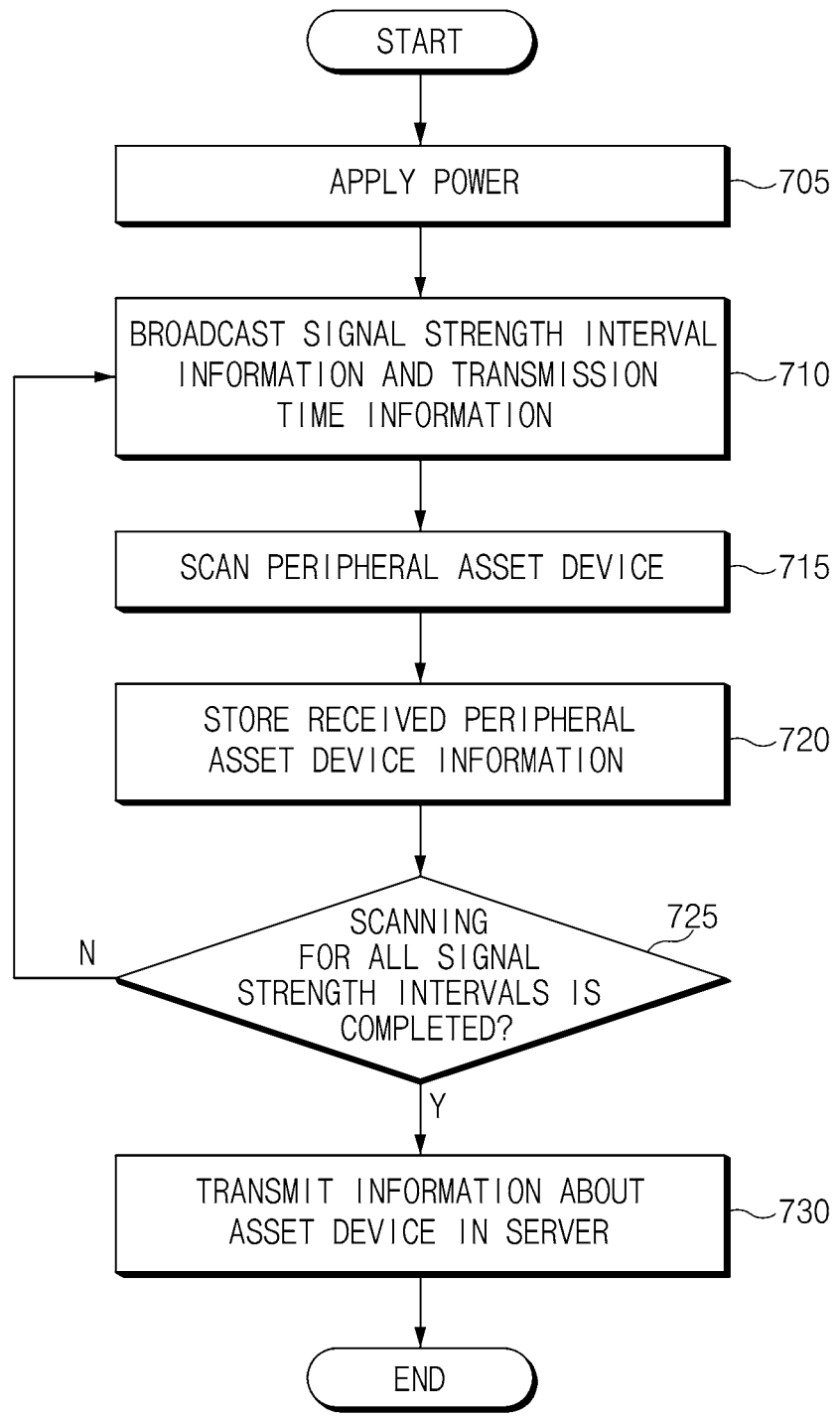
FIG. 7 is a flowchart of an electronic device scanning method according to various embodiments.

FIG. 7 is a flowchart of an electronic device scanning method according to various embodiments.

According to various embodiments, in operation 705, power may be applied to an electronic device (e.g., the electronic device 201 in FIG. 4). According to an embodiment, operation 705 may be replaced with a user input to the electronic device 201 or an input from an external electronic device (e.g., the external electronic device 401 in FIG. 4).

According to various embodiments, in operation 710, the processor 220 of the electronic device 201 may control the broadcasting of signal strength information and transmission time information. For example, the processor 220 may broadcast the signal strength information and the transmission time information, using the communication circuit 290. For example, the signal strength information and the transmission time information may be referred to as a "transmission token". For example, the processor 220 may advertise or broadcast a message including a transmission token, using the communication circuit 290.

According to an embodiment, information corresponding to Table 1 and Table 2 below may be included in the message.

TABLE 1

| Item | Remark | Size (bytes) |
|---|---|---|
| Service UUID | Indicating that it is an asset managing service | 16 |
| Transmission power | Indicating transmission power level | 1 |

TABLE 2

| Item | Size (bytes) | Value | Remark |
|---|---|---|---|
| Service type | 1 | 4-7 | Reserved for future use (RFU) |
|  |  | 3 | Managing Agent - On Demand |
|  |  | 2 | Managing Agent - RSSI Token |
|  |  | 1 | Managing Agent |
|  |  | 0 | Managing Agent |

TABLE 2-continued

| Item | Size (bytes) | Value | Remark |
|---|---|---|---|
| Unique ID | 16 | — | Unique ID of a device (Unique ID of a managing agent) |
| Maximum RSSI | 1 | — | Maximum RSSI value of received signal strength range |
| Minimum RSSI | 1 | — | Minimum RSSI value of received signal strength range |
| Time | 2 | — | Remaining advertisement time |

According to an embodiment, the maximum RSSI and the minimum RSSI may indicate the received power level of a specific value. For example, the maximum RSSI and the minimum RSSI may indicate the received power level independently of the transmission power field. According to an embodiment, the maximum RSSI and the minimum RSSI may be indicated as relative values for the transmission power level. For example, the maximum RSSI and the minimum RSSI may indicate minimum and maximum values of an attenuation value that may be allowed from the transmission power indicated by a transmission power field.

According to an embodiment, an asset device (e.g., the asset device 301 of FIG. 4) may determine whether the received power corresponds to the band information (e.g., minimum RSSI~maximum RSSI) indicated by the transmission token, based on the received power of the message including the transmission token received from the electronic device 201. According to an embodiment, the asset device 301 may compare the received power of the message including the transmission token received from the electronic device 201 with the transmission power level included in the message and then may determine whether the received power level corresponds to a range between maximum RSSI and minimum RSSI. According to an embodiment, when the received power level corresponds to the range between maximum RSSI and minimum RSSI, the asset device 301 may advertise information of the asset device 301 depending on time information. The maximum RSSI, minimum RSSI, and time in Table 2 may be referred to as a token or an RSSI token.

According to an embodiment, the information in Table 1 and the information in Table 2 may be transmitted using one data packet. According to another embodiment, information in Table 1 and information in Table 2 may be transmitted using different packets. For example, the processor 220 may transmit the second packet including the information in Table 2 after transmitting the first packet including the information in Table 1, or may transmit the first packet after transmitting the second packet.

According to various embodiments, in operation 715, the processor 220 may scan the peripheral asset device 301. For example, the processor 220 may scan the peripheral asset device 301 by monitoring the signal received from the at least one peripheral asset device 301 during a specified period, using the communication circuit 290.

According to various embodiments, in operation 720, when asset device information is received from the at least one peripheral asset device 301 by using the communication circuit 290, the processor 220 may store the received peripheral asset device information in the memory 230. For example, the peripheral asset device information may include identification information, type information, capability information, received signal strength information, and/or location information (e.g., angle of arrival and/or angle of departure) of the peripheral asset device 301.

According to various embodiments, in operation 725, the processor 220 may determine whether scanning for all signal strength intervals is completed. When the scanning for all signal strength intervals is not completed, the processor 220 may control the scanning for subsequent signal strength intervals to be performed.

According to various embodiments, when the scanning for all signal strength intervals is completed, in operation 730, the processor 220 may transmit information about the at least one asset device 301 stored in a server (e.g., the server 408 in FIG. 4), using the communication circuit 290.

According to an embodiment, the server 408 may track the location of the asset device 301, based on information about the asset device 301 received from the electronic device 201. For example, the server 408 may determine triangulation, signal strength, angle of arrival, and/or angle of departure on the asset device 301, using the information of the asset device 301 received from the at least one electronic device 201. According to another embodiment, the electronic device 201 may track the location of the asset device 301 based on the obtained information of the asset device 301. For example, the electronic device 201 may track the location of the asset device 301, using triangulation, signal strength, angle of arrival, and/or angle of departure on the asset device 301. For example, the electronic device 201 may transmit information about the tracked location of the asset device 301, to the server 408.

In the above-described embodiment, operation 725 has been performed prior to operation 730, but operation 725 may be performed after operation 730. For example, the processor 220 may transmit information of the asset device 301 to the server 408 whenever the scanning for each band is completed.

Figure 8:
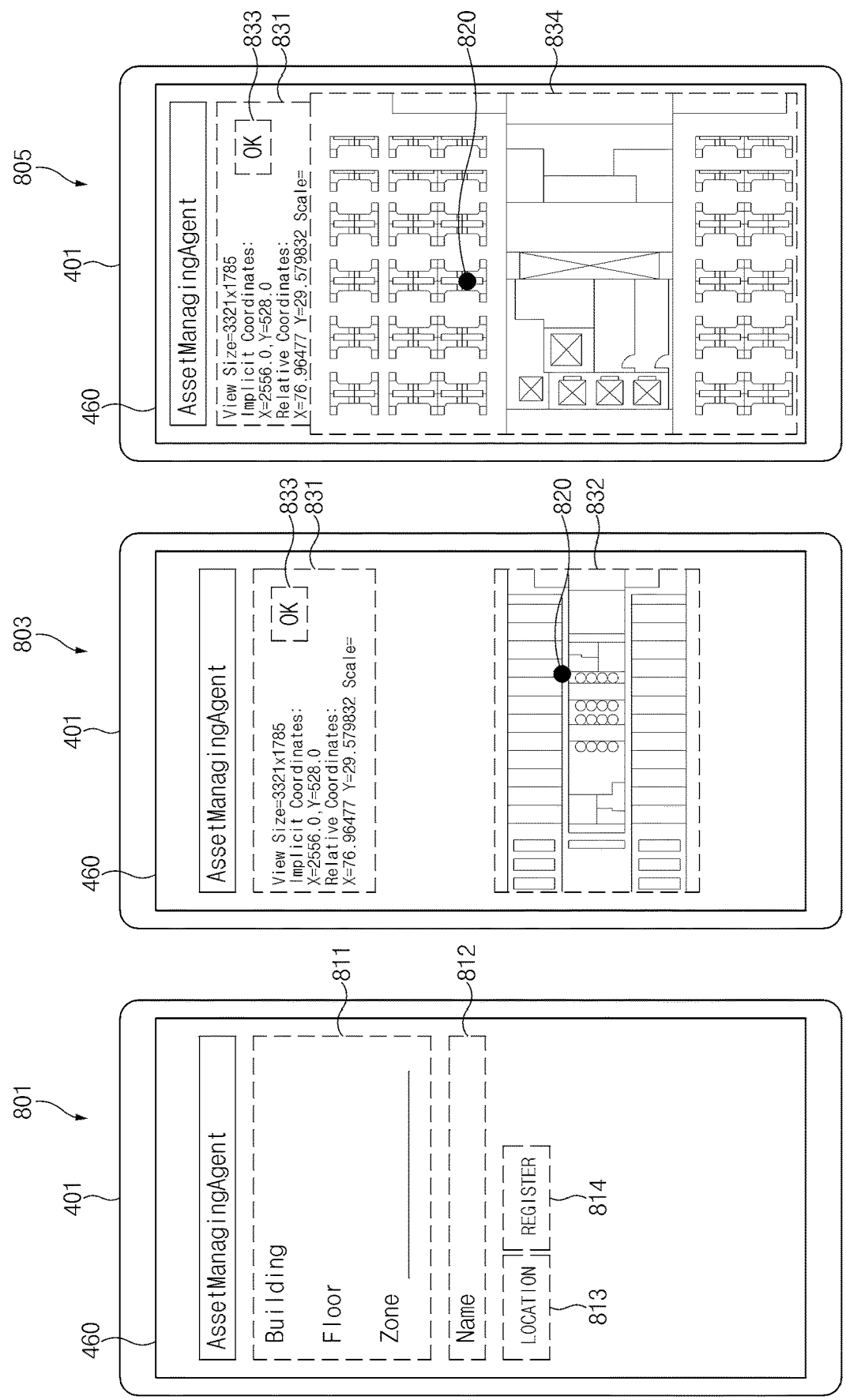
FIG. 8 illustrates an asset managing user interface according to various embodiments.

FIG. 8 illustrates an asset managing user interface according to various embodiments.

According to various embodiments, the external electronic device 401 (e.g., the electronic device 101 of FIG. 1) may provide a first interface 801, a second interface 803, and a third interface 805 for the registration of an electronic device (e.g., the electronic device 201 in FIG. 4), using the display device 460. The first, second, and third interfaces 801, 803, and 805 described below may be provided through a display device (not illustrated) of the electronic device 201.

According to various embodiments, the external electronic device 401 may register the electronic device 201 in the server (e.g., the server 408 in FIG. 4) based on the user input to the first interface 801. For example, the external electronic device 401 may register the electronic device 201 in an account.

According to various embodiments, the first interface 801 may include a data input interface 811 for inputting the location of the electronic device 201. For example, the server 408 may determine the schematic location of the electronic device 201 based on the location information of the external electronic device 401 or the electronic device 201 and may transmit the determined location information to the external electronic device 401. According to an embodiment, the external electronic device 401 may provide the data input interface 811 based at least on the information received from the server 408. For example, the external electronic device 401 may provide the data input interface 811 including a candidate location of the electronic device 201 based at least on the information received from the server 408.

According to various embodiments, the first interface 801 may include an input interface 812 for specifying the name of the electronic device 201. The name of the electronic device 201 may be a name capable of being exposed to a user, and may be specified differently from the identifier of the electronic device 201.

According to various embodiments, the first interface 801 may include a location button 813 for specifying the location of the electronic device 201. According to an embodiment, the first interface 801 may include a button 814 for registering the electronic device 201 in the server 408. For example, the button 814 may be activated after information about a specified information field is entered.

According to an embodiment, when an input to the button 813 is received, the external electronic device 401 may provide the second interface 803 for location registration. For example, the second interface 803 may include a map 832 corresponding to the input location information and map scale information 831 corresponding to the map 832. According to an embodiment, the external electronic device 401 may assign the location of the electronic device 201 based on a user input to a first location 820 of the external map 832. For example, when an input to a button 833 is received, the external electronic device 401 may register the specified location in the server 408 as the location of the electronic device 201.

According to an embodiment, when a user input to the first location 820 is received, the third interface 805 including an enlarged map 834 may be provided. According to another embodiment, the enlarged map 834 may be provided based on a user input to the map 832. For example, the external electronic device 401 may provide the enlarged map 834 based on a user input to the first location 820. For example, the external electronic device 401 may receive the exact location of the electronic device 201 from the user through the enlarged map 834. For example, the external electronic device 401 may display the first location 820 specified by the user input, on the enlarged map 834.

According to an embodiment, when an input to the button 833 is received, the first interface 801 may be provided again. For example, when an input to the button 833 is received, the external electronic device 401 may display the first interface 801 on the display device 460; when an input to a registration button 814 is received, the external electronic device 401 may register the electronic device 201 in the server 408 by transmitting the input information and location information to the server 408. For example, the external electronic device 401 may be logged in to a database associated with the server 408, using an account.

Figure 9:
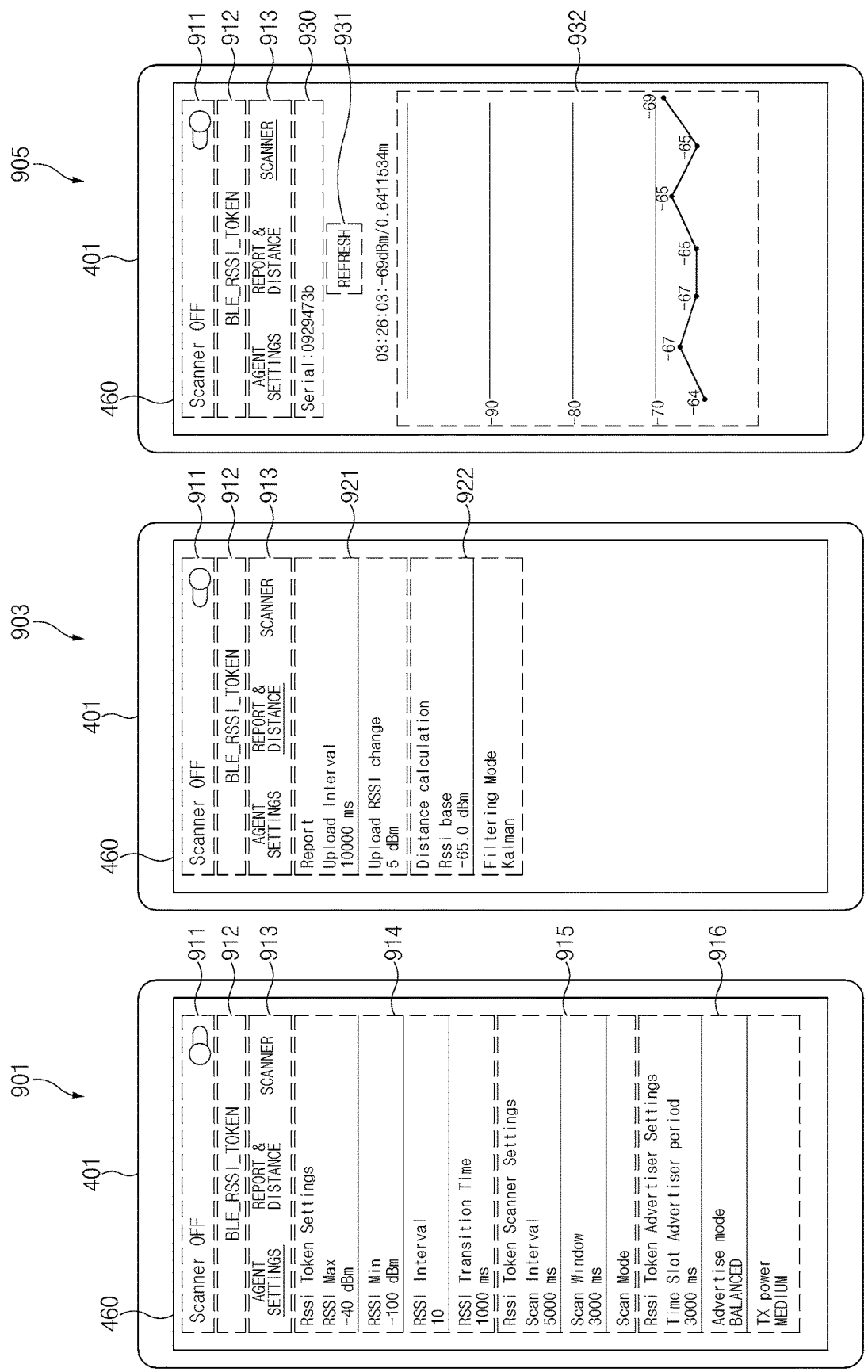
FIG. 9 illustrates an electronic device user interface according to various embodiments.

FIG. 9 illustrates an electronic device user interface according to various embodiments.

According to various embodiments, the external electronic device 401 (e.g., the electronic device 101 of FIG. 1) may provide a first interface 901, a second interface 903, and a third interface 905 for the control of an electronic device (e.g., the electronic device 201 in FIG. 4), using the display device 460. The first, second, and third interfaces 901, 903, and 905 described below may be provided through a display device (not illustrated) of the electronic device 201.

According to an embodiment, the first interface 901 may include a scanner on/off button 911 for turning on/off the operation in which the electronic device 201 scans the asset device 301. According to an embodiment, the first interface 901 may include an interface 912 for selecting an operating mode of the electronic device 201. For example, a BLE-based RSSI token mode, a general operating mode, or a time slot mode may be selected as an operating mode of the electronic device 201.

According to an embodiment, the first interface 901 may include a selection interface 913 for selecting a control category of the electronic device 201. For example, it may be assumed that the agent settings of the electronic device 201 are selected in the first interface 901.

According to an embodiment, the first interface 901 may include RSSI token configuration information 914. For example, the RSSI token configuration information 914 may include an RSSI band maximum value, an RSSI band minimum value, RSSI band interval information, and an RSSI band transition time. For example, the maximum RSSI band value may be set to −40 dBm; the minimum RSSI band value may be set to −100 dBm; and the RSSI band interval may be set to 10 dBm. In this case, six RSSI bands may be set. For example, when the RSSI band transition time is set to 500 ms, scanning of 6 RSSI bands may require 3 seconds. For example, the RSSI band transition time may include an RSSI token advertisement time for a single RSSI band and a response monitoring time from the asset device 301.

According to an embodiment, the electronic device 201 may advertise the RSSI token during a specified time within the RSSI band transition time and then may monitor the response from the asset device 301. For example, the electronic device 201 may advertise the RSSI token during a specified time, and then may monitor the response from the asset device 301 after a specific time (e.g., guard period or guard time). According to an embodiment, the electronic device 201 may simultaneously perform RSSI token advertisement and response monitoring from the asset device 301 within the RSSI band transition time. According to an embodiment, the electronic device 201 may substantially simultaneously perform RSSI token advertisement and response monitoring from the asset device 301 within the RSSI band transition time.

According to an embodiment, the electronic device 201 may include information about the response transmission time of the asset device 301 in the RSSI token advertisement. For example, the electronic device 201 may set response transmission time information based on the transmission time of the RSSI token advertisement. For example, the electronic device 201 may set transmission time information by subtracting the elapsed time in the corresponding band from the RSSI token advertisement time for each band. According to an embodiment, the RSSI band time of 1 second may be set for the first band. For example, after the transition to the first band or the start of scanning in the first band, the electronic device 201 may transmit an RSSI token advertisement after 0.5 seconds. In this case, the electronic device 201 may set the time obtained by subtracting 0.5 seconds from 1 second, as the transmission time information.

According to an embodiment, the first interface 901 may include RSSI token scanner configuration information 915. For example, the RSSI token scanner configuration information 915 may include scan interval information indicating the time period during which the electronic device 201 performs scanning, and scan window information indicating the length of the time window during which the scanner performs scanning, and scan mode information indicating scan sensitivity. According to an embodiment, the first interface 901 may include RSSI token advertiser configuration information 916. For example, the RSSI token advertiser configuration information 916 may include settings for RSSI advertisements including an RSSI token. For example, the RSSI token advertiser configuration information 916 may include information about a period in which an RSSI advertisement is transmitted, information about an advertisement mode (information about the number of times that an advertisement is repeated in the cycle), and information about transmission power settings.

According to an embodiment, the external electronic device 401 may provide a mode selection interface 913 in response to the report of the electronic device 201 and the selection of a distance mode.

According to an embodiment, the second interface 903 may include report configuration information 921 for reporting information of the asset device (e.g., the asset device 401 of FIG. 4). For example, the report configuration information 921 may include time interval information for the electronic device 201 to upload the information of the asset device to the server (e.g., the server 408 in FIG. 4) and an RSSI change criterion for uploading the associated RSSI change of the asset device 301. For example, when the reported RSSI value for the at least one asset device 301 is changed by the specified change criterion (e.g., 5 dBm) or more, the electronic device 401 may report the RSSI value change of the asset device 301 to the server 408. For example, when the RSSI value for the at least one asset device 301 is changed by the specified change criterion (e.g., 5 dBm) or more, the electronic device 201 may report the RSSI value change of the asset device 301 to the server 408.

According to an embodiment, the second interface 903 may include distance calculation configuration information 922. For example, the distance calculation configuration information 922 may include a reference value for measuring a distance based on reception signal strength (e.g., RSSI), and information about a filter mode (e.g., a Kalman filter) for the RSSI value.

According to an embodiment, the external electronic device 401 may provide the third interface 905 in response to the scanner mode selection of the mode selection interface 913.

For example, the third interface 905 may include an asset device selection interface 930. For example, the external electronic device 401 may provide the asset device selection interface 930 including a list of asset devices based on information from the server 408 or the electronic device 201.

According to an embodiment, the third interface 905 may include RSSI information 932 about the selected asset device (e.g., the asset device 301). For example, the external electronic device 401 may update the RSSI information 932 based on an input to an update button 931.

Figure 10:
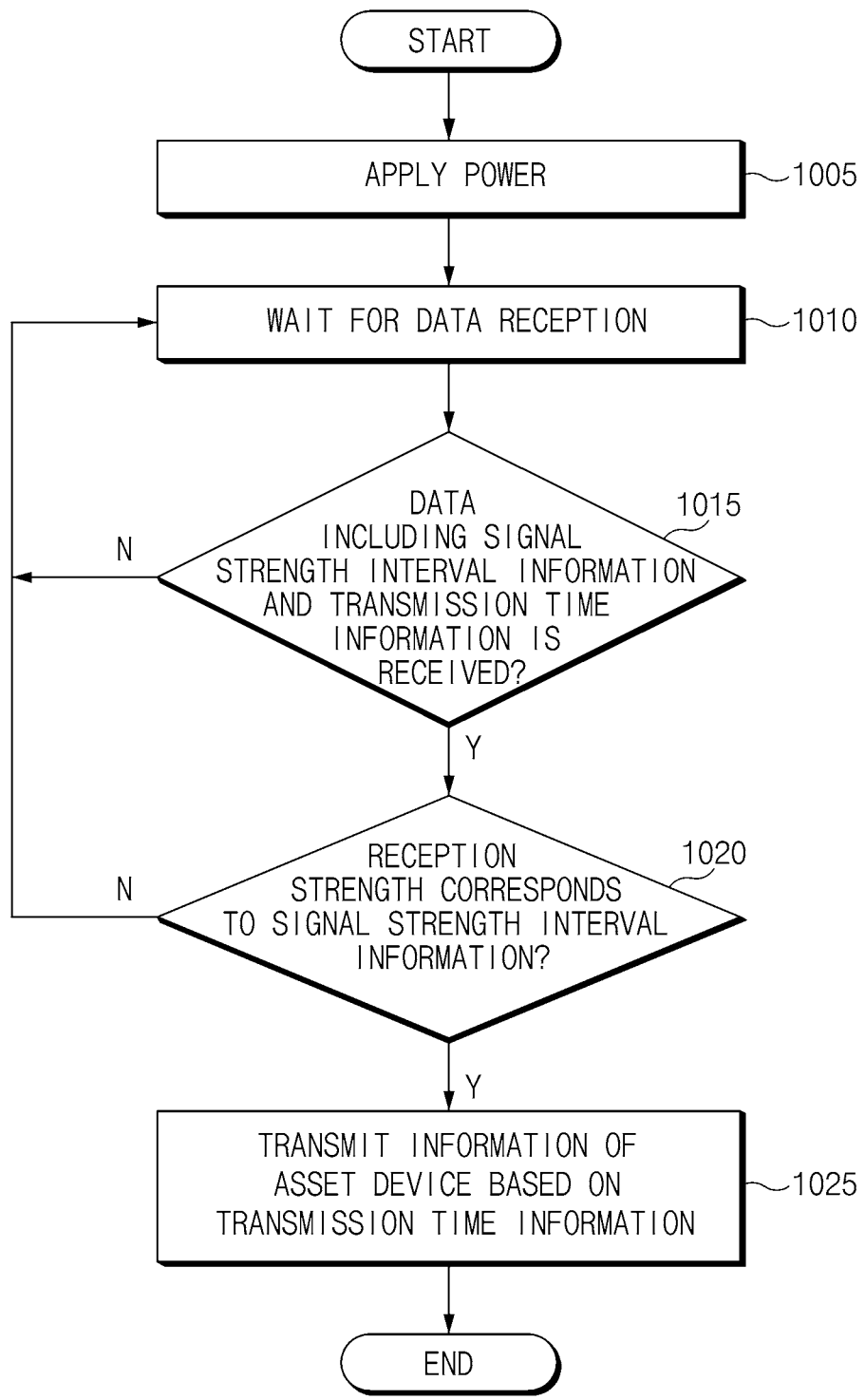
FIG. 10 is a flowchart of a method for transmitting asset device information according to various embodiments.

FIG. 10 is a flowchart of a method for transmitting asset device information according to various embodiments.

According to various embodiments, in operation 1005, power may be applied to an asset device (e.g., the asset device 301 of FIG. 4). According to an embodiment, operation 1005 may be skipped.

According to various embodiments, in operation 1010, the processor 320 of the asset device 301 may wait for data reception. For example, the processor 320 may monitor signals from another electronic device (e.g., the electronic device 201), using the communication circuit 390. For example, the processor 320 may perform operation 1010 based on a user input or a specified period.

According to various embodiments, in operation 1015, the processor 320 may determine whether data including signal strength interval information and transmission time information is received. For example, the processor 320 may determine whether data is received, based on whether a token including the signal strength interval information and the transmission time information is received. For example, the processor 320 may determine whether data is received based on whether a data packet including service type information (e.g., service type information in Table 2) indicating the token is received. When the data including the signal strength interval information and the transmission time information is not received, for example, the asset device 301 may continue to wait for data reception depending on operation 1010.

According to various embodiments, when data including the signal strength interval information and the transmission time information is received, in operation 1020, the processor 320 may determine whether the signal strength of the received data corresponds to the signal strength interval information. For example, the processor 320 may perform operation 1020 by comparing the reception signal strength with the signal strength interval information. For example, when the signal strength of the received data does not correspond to the signal strength interval information, the processor 320 may wait for data reception depending on operation 1010.

According to various embodiments, when the signal strength of the received data corresponds to the signal strength interval information, in operation 1025, the processor 320 may transmit (e.g., broadcast or advertise) information of the asset device 301 based on the received transmission time information. According to an embodiment, the processor 320 may transmit the information of the asset device 301 at a specified period and a specified transmission power, during a time interval corresponding to the received transmission time information. For example, the information of the asset device 301 may include at least part of the unique identifier, unique number, or identifier of the asset device 301. For another example, the information of the asset device 301 may include at least one of transmission power information, angle of departure, and angle of arrival.

In the embodiment of FIG. 10, the asset device 301 may continuously monitor the reception of a beacon signal (e.g., data including signal strength interval information and transmission time information) from the electronic device 201. According to another embodiment, when a beacon signal is not received from the electronic device 201 during a specified time or longer, the asset device 301 may be configured to transmit a beacon signal including information of the asset device 301 depending on a specified period.

Figure 11:
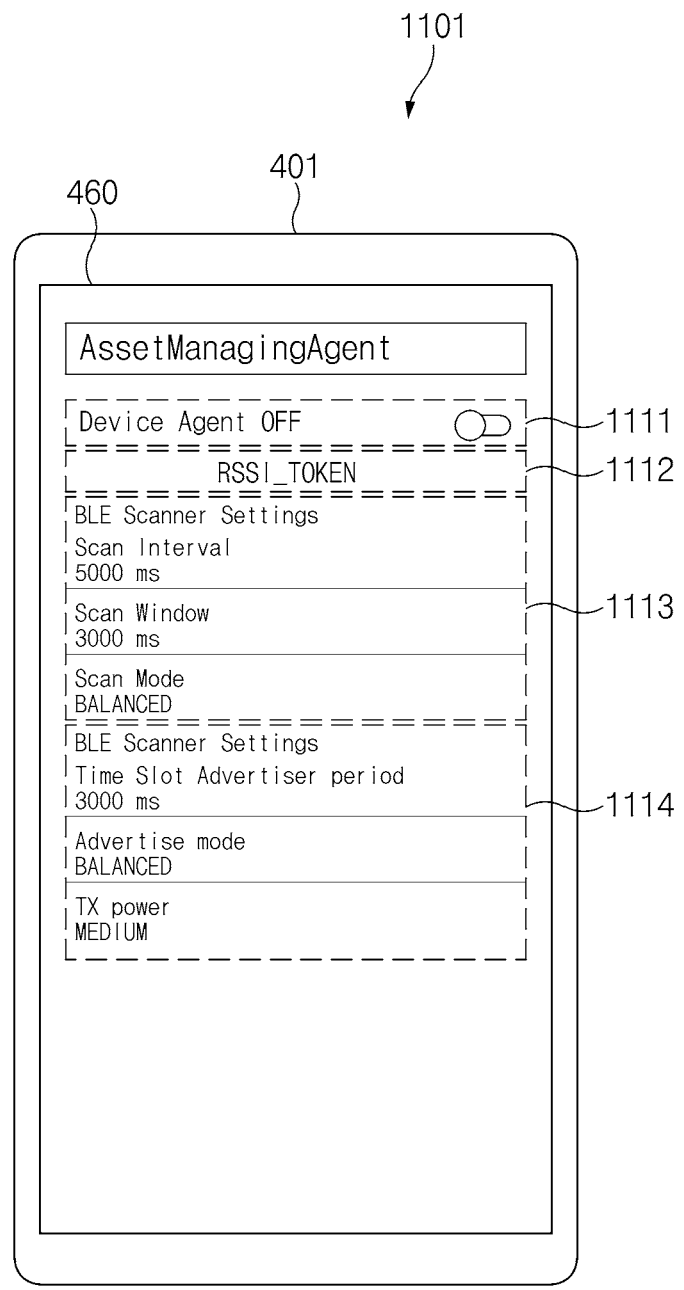
FIG. 11 illustrates an asset device user interface according to various embodiments.

FIG. 11 illustrates an asset device user interface according to various embodiments.

According to various embodiments, the external electronic device 401 (e.g., the electronic device 101 of FIG. 1) may provide an interface 1101 for the control of an asset device (e.g., the asset device 301 in FIG. 4), using the display device 460. The interface 1101 described below may be provided through a display device (not illustrated) of the asset device 301.

According to an embodiment, the interface 1101 may include an interface 1111 for controlling turn-on/turn-off of the asset device 301. According to an embodiment, the interface 1101 may include the interface 1111 for standby/wakeup control.

According to an embodiment, the interface 1101 may include a selection interface 1112 for selecting an operating mode of the asset device 301. For example, the selection interface 1112 may include an operating mode that allows the asset device 301 to operate based on the RSSI token. For example, the selection interface 1112 may include an operating mode that allows the asset device 301 to operate based on a general BLE protocol. For example, the selection interface 1112 may include an operating mode that allows the asset device 301 to operate based on a specific time slot.

According to an embodiment, the interface 1101 may include BLE scanner configuration information 1113. For example, the scanner configuration information 1113 may include the period information for the asset device 301 to scan the RSSI token, information about the scan time interval in which the scan is continued, and information about the scan mode associated with scan sensitivity.

According to an embodiment, the interface 1101 may include BLE advertiser configuration information 1114. For example, the advertiser configuration information 1114 may include transmission period information of a beacon signal including information of the asset device 301, a mode (e.g., a mode associated with a transmission frequency within a specified time) for transmitting information of the asset device 301, and information about transmission power.

Figure 12:
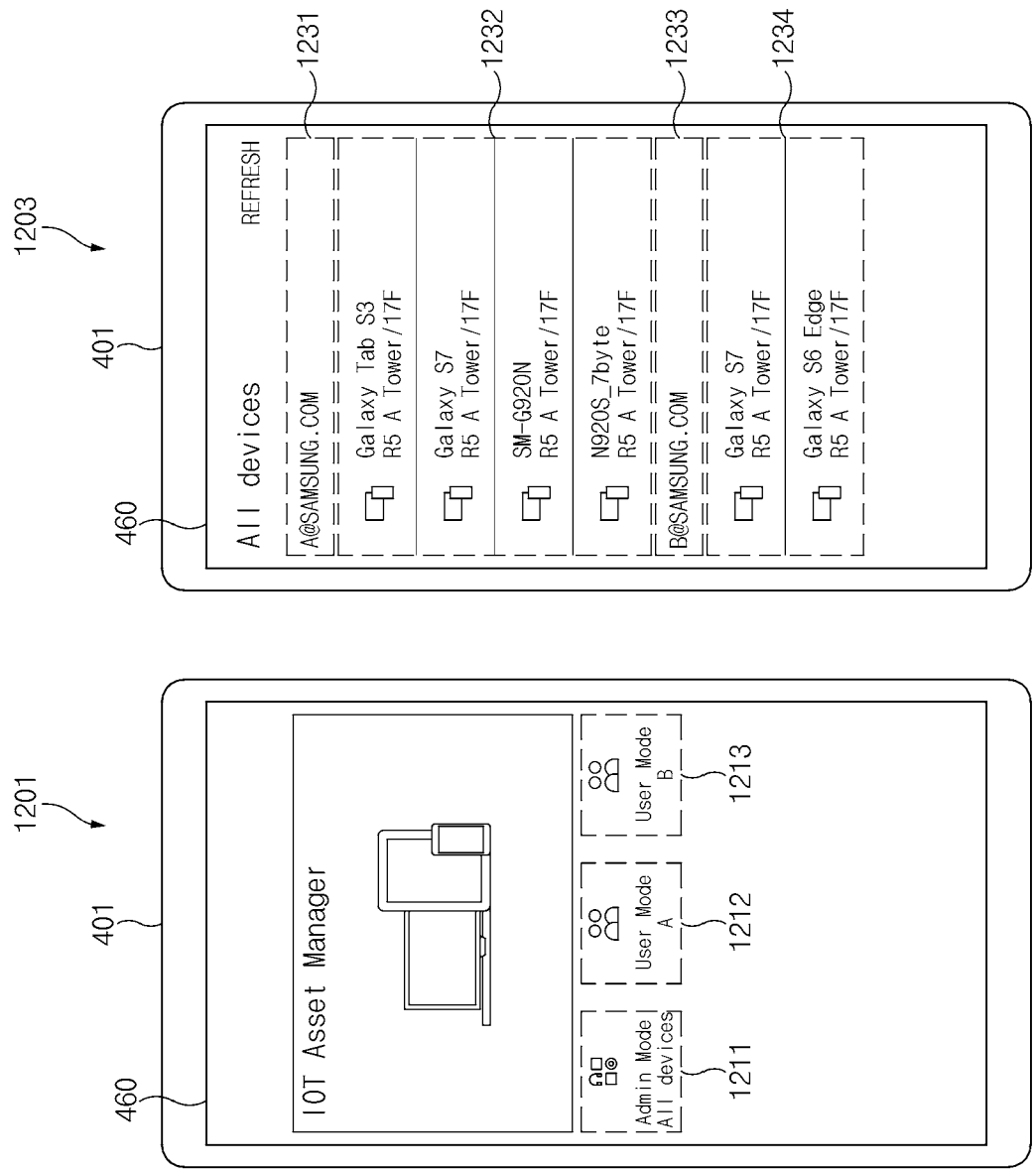
FIG. 12 illustrates a user interface for selecting an asset device according to various embodiments.

FIG. 12 illustrates a user interface for selecting an asset device according to various embodiments.

According to various embodiments, an external electronic device (e.g., the external electronic device 401 in FIG. 4) may access a server (e.g., the server 408 of FIG. 4) storing information about the asset device (e.g., the asset device 301 of FIG. 4) and then may query asset device information. For example, the external electronic device 401 may query the asset device information based on the authority of the account registered in the server 408. For example, in the case of a general account, the external electronic device 401 may query information of the asset device 301 associated with the corresponding account. For another example, in the case of an administrator account, the external electronic device 401 may query the information of the asset device 301 associated with a plurality of accounts. For example, in the case of the administrator account of a specific region (e.g., a specific building or a specific floor) or a specific device (e.g., the electronic device 201), the external electronic device 401 may query information of all asset devices 301 associated with the specific region or the specific device.

According to an embodiment, the external electronic device 401 may provide a first user interface 1201 for account selection on the display device 460. For example, the first user interface 1201 may include an interface for selecting at least one account associated with the external electronic device 401 or the electronic device 201. For example, the first user interface 1201 may include an administrator account selection interface 1211, an account A selection interface 1212, and an account B selection interface 1213.

According to an embodiment, when the administrator account is selected, the external electronic device 401 may display a second user interface 1203 indicating asset device information about a plurality of accounts on the display device 460. For example, the second user interface 1203 may include information 1231 or 1233 about each account and a list of asset devices 1232 and 1234 associated with each account. According to an embodiment, the external electronic device 401 may display information of the corresponding at least one asset device 301, on the display device 460 based on the input to the asset device list. For example, the information of the asset device 301 may include at least one of a product name, a model name, a unique number, location information, or asset device status information.

Figure 13:
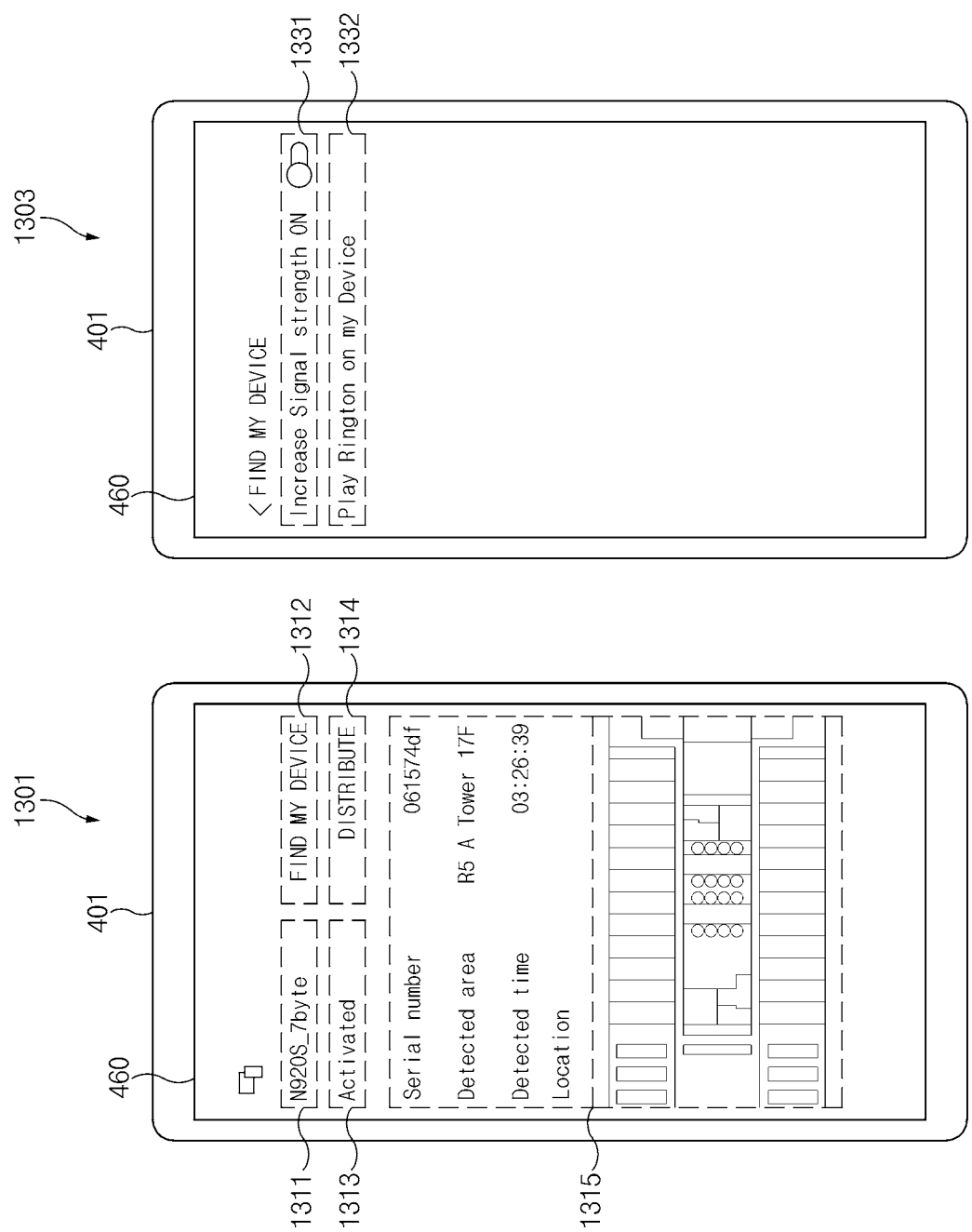
FIG. 13 illustrates a user interface for tracking an asset device according to various embodiments.

FIG. 13 illustrates a user interface for tracking an asset device according to various embodiments.

According to various embodiments, an external electronic device (e.g., the external electronic device 401 of FIG. 4) may display information about the asset device (e.g., the asset device 301 of FIG. 4) on the display device 460. For example, the external electronic device 401 may provide a first user interface 1301 based on the input to the asset device list 1232 or 1234 of FIG. 12.

According to an embodiment, the first user interface 1301 may include asset device information 1311 (e.g., an asset device name and/or an identifier), an asset device tracking button 1312, asset device status information 1313, an asset device information distribution button 1314, and asset device location information 1315. For example, the external electronic device 401 may distribute information of the asset device 301 to another electronic device (e.g., another external electronic device (not illustrated)), another server (not illustrated), or other accounts, based on an input to the asset device information distribution button 1314.

According to an embodiment, the external electronic device 401 may provide a second user interface 1303 based on an input to the asset device tracking button 1312. For example, the second user interface 1303 may include a control interface 1331 for controlling signal strength and a control signal transmission interface 1332. For example, when the input to the control signal transmission interface 1332 is received, the external electronic device 401 may allow the electronic device 201 to transmit an on-demand signal that allows the associated asset device 301 to perform a specific operation (e.g., playing a ring tone). For example, the external electronic device 401 may allow the electronic device 201 to transmit an on-demand signal by controlling the electronic device 201 through the server 408 or through short-range wireless communication (e.g., Wi-Fi, BLE, Bluetooth, ZigBee, UWB, or NAN). For example, the external electronic device 401 may transmit the on-demand signal to the asset device 301 through the short-range wireless communication (e.g., Wi-Fi, BLE, Bluetooth, ZigBee, UWB, or NAN).

The control of the asset device 301 through the on-demand signal is not limited to playing ring tone. For example, various operations may be performed by the asset device 301 through the on-demand signal. According to an embodiment, the electronic device 201 may transmit an on-demand signal based on an input from the external electronic device 401, the server 408, or a user interface (not illustrated) of the electronic device 201. For example, the on-demand signal may include information shown in Table 3.

TABLE 3

| Item | Size (bytes) | Value | Remark |
| --- | --- | --- | --- |
| Service type | 1 | 4-7 | Reserved for future use (RFU) |
| | | 3 | Managing Agent - On Demand |
| | | 2 | Managing Agent - RSSI Token |
| | | 1 | Managing Agent |
| | | 0 | Managing Agent |
| Unique ID | 7 | — | Unique ID of on-demand |
| Unique ID of a device | 7 | — | Identifier of an asset device |
| On demand service type | 1 | 0 | RF signal amplification ON |
| | | 1 | RF signal amplification OFF |
| | | 2 | Generating beep sound |

For example, the electronic device 201 may notify the asset device 301 that the corresponding signal (e.g., a packet) is an on-demand signal, by setting the value of a service type to a value (e.g., 3) indicating an on-demand service. For example, the unique ID may include information for logging in to the server 408 or an account in the unique ID of the electronic device 201. For example, the unique ID of a device may include the identifier of the target asset device of the corresponding on-demand signal.

According to an embodiment, when it is indicated that the service type information of the received packet is the on-demand service, the asset device 301 may identify a device unique ID. For example, when the device unique ID corresponds to the ID of the asset device 301, the asset device 301 may perform an operation indicated by the on-demand service type. For example, the on-demand service type may include operations of playing beep sound, turning on/off an RF signal, and/or turning on/off RF signal amplification.

Figure 14:
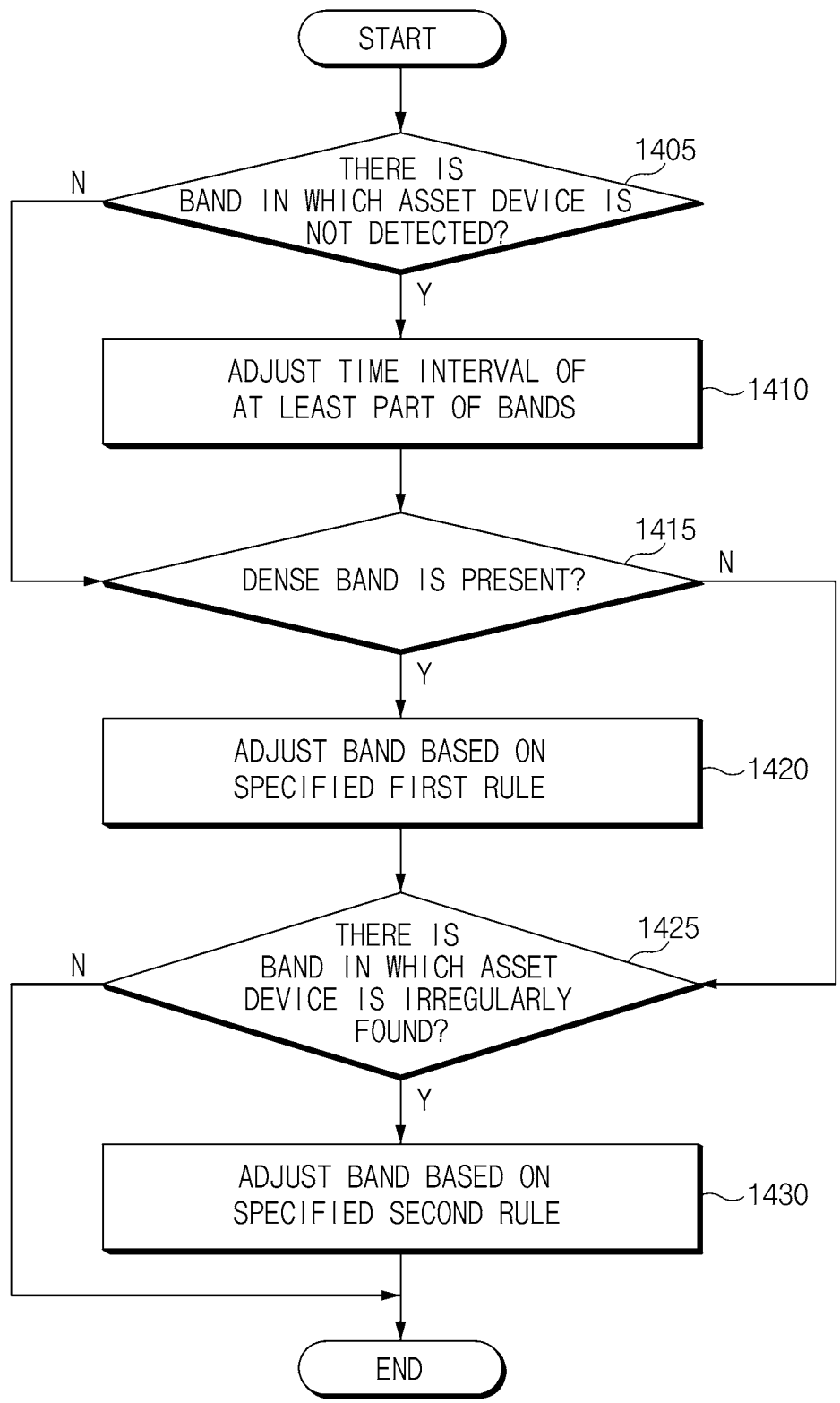
FIG. 14 is a flowchart of a method for adjusting a signal strength band according to various embodiments.

FIG. 14 is a flowchart of a method for adjusting a signal strength band according to various embodiments.

According to various embodiments, in operation 1405, the processor 220 of an electronic device (e.g., the electronic device 201 in FIG. 4) may determine whether there is a band in which an asset device (e.g., the asset device 301 in FIG. 4) is not detected. For example, the electronic device 201 may perform operation 1405 after the scanning for all bands is completed. According to an embodiment, the processor 220 may determine whether there is a band in which the asset device 301 has not been continuously detected the specified number of times or more. When there is no band in which the asset device 301 is not detected, the processor 220 may perform operation 1415.

According to various embodiments, when there is a band in which the asset device 301 is not detected, the processor 220 may adjust the time interval of at least part of bands. According to an embodiment, when there is an idle band in which the asset device 301 is not detected, the processor 220 may reduce the band time interval for the idle band. For example, when the same band is detected as the idle band, the processor 220 may sequentially decrease the time interval for the idle band. For example, when the idle band is detected in the first scanning procedure, the processor 220 may reduce the band time interval for the corresponding idle band to ½ of the specified band time interval. According to an embodiment, the processor 220 may perform subsequent scanning, based on the reduced band time interval. For example, when the same band is detected again as the idle band in the second scanning procedure, the processor 220 may reduce the band time interval in the idle band to ⅓ of the specified band time interval. For another example, when the at least one asset device 301 is detected in the same band in the second scanning procedure, the processor 220 may set the band time interval in the corresponding band to a specified band time.

According to various embodiments, in operation 1415, the processor 220 may determine whether a dense band is present. For example, the processor 220 may determine a band in which the asset devices 301, of which the number is not less than the specified number, are detected, as a dense band. For example, the processor 220 may determine a band, in which the number of detected asset devices 301 is greater than the average number of asset devices 301 for each band with respect to the entire asset devices 301, as a dense band. According to an embodiment, when a dense band is not present, the processor 220 may perform operation 1425.

According to various embodiments, in operation 1420, when a dense band is present, the processor 220 may adjust the band based on the specified first rule. According to an embodiment, the first rule may include an increase in the length of a time interval for a band having a density that is not less than a specified density. For example, the processor 220 may increase the length of the band time interval for the dense band. For example, the processor 220 may increase the length of the band time interval for the dense band and may decrease the length of the band time interval for the remaining bands. According to an embodiment, the first rule may include band division for a band having a density that is not less than the specified density. For example, the processor 220 may increase the total number of bands by dividing the dense band into two or more bands. According to an embodiment, the first rule may include the time interval length adjustment and band division for the band having a density that is not less than the specified density. For example, the processor 220 may divide the dense band and may simultaneously adjust the band time interval of the divided band.

According to an embodiment, the processor 220 may search for the asset device 301 in the interval of a −50 dBm to −100 dBm in units of 10 dBm. For example, the processor 220 may perform scanning on 5 bands for the entire time 'T'. For example, 100 asset devices 301 have been found for the entire band, and thus 70 asset devices 301 may be found in the band (hereinafter, a first band) between −50 dBm and −60 dBm. For example, the first rule may include the length adjustment of a density-based band time interval. In this case, according to an embodiment, the processor 220 may allocate 70/100 of the total time 'T' to the first band depending on the first rule, and may evenly allocate the remaining time to the remaining bands. According to an embodiment, the processor 220 may classify the first band into a plurality of bands (e.g., a band of −50 dBm to −55 dBm and a band of −55 dBm to −60 dBm) depending on the first rule. According to an embodiment, the processor 220 may divide the first band into a plurality of bands (e.g., two bands) depending on the first rule, may evenly allocate 70/100 of the total time 'T' to the divided bands (e.g., 7T/20), and may evenly allocate the remaining time to the remaining bands.

According to various embodiments, in operation 1425, the processor 220 may determine whether there is an irregular band in which the asset device 301 is irregularly found. For example, processor 220 may set a count for each band. According to an embodiment, when the asset device 301 is found in a band during scanning, the processor 220 may decrease the count for the band; when the asset device 301 is not found, the processor 220 may increase the count for the band. According to an embodiment, when the count for a specific band exceeds a specified value, the processor 202 may determine the corresponding band as an irregular band. In operation 1430, according to an embodiment, the processor 220 may adjust the band based on the specified second rule. For example, the processor 220 may regard a band exceeding the count of a specified value as an idle band (e.g., the idle band in operation 1405) and then may perform the reduction in scanning time for the idle band or the reduction in scanning frequency for the idle band. For example, in the following scanning procedure, the band time interval in the corresponding irregular band may be reduced as in operation 1410.

In the embodiment of FIG. 14, at least some operations may be omitted. According to an embodiment, operations 1405 and 1410, operations 1415 and 1420, or operations 1425 and 1430 may be omitted. According to an embodiment, only operations 1405 and 1410 may be performed; only operations 1415 and 1420 may be performed; alternatively, only operations 1425 and 1430 may be performed.

The band controlling method illustrated in FIG. 14 is exemplary, and various band control methods may be used. According to an embodiment, the processor 220 may adjust the band based on a response signal (e.g., a beacon signal) from the asset device 301. For example, the token time of the beacon signal transmitted by the asset device 301 may be frequently changed due to fading. According to an embodiment, when the frequency of changing the token signal is not less than a specified range, the processor 220 may increase the length of the transmission time interval for a band. For example, the processor 220 may increase the reception probability of information transmitted by the asset device 301 in the corresponding band, by increasing the length of the transmission time interval.

Figure 15:
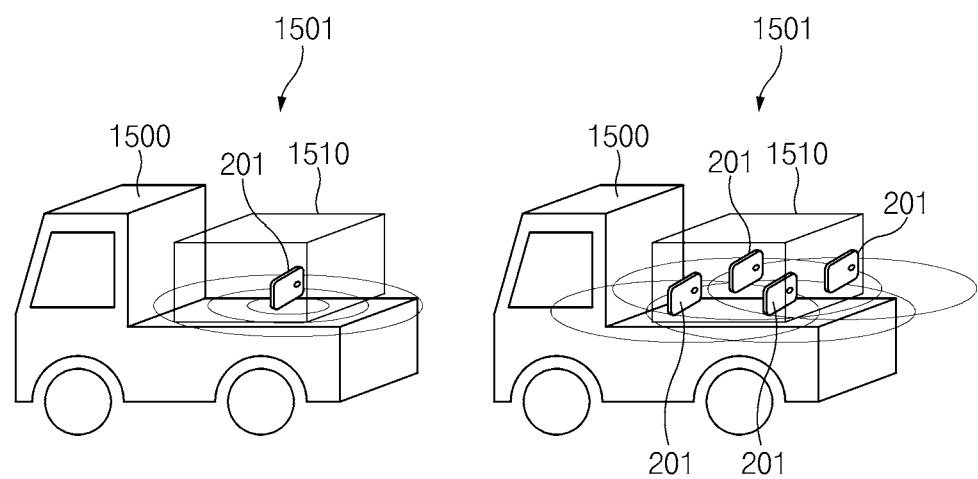
FIG. 15 illustrates an example of asset device management according to various embodiments.

FIG. 15 illustrates an example of asset device management according to various embodiments.

According to various embodiments, an electronic device (e.g., the electronic device 201 in FIG. 4) may be mounted on a device having the same mobility as a vehicle 1500. For example, the electronic device 201 may transmit information about cargoes (e.g., the asset device 301 in FIG. 4) inside a cargo box 1510 in a server (e.g., the server 408 in FIG. 4) through a cellular network. For another example, the electronic device 201 may transmit information about the vehicle 1500 and/or an electronic device (e.g., the external electronic device 401 of FIG. 4) associated with the vehicle 1500 to the server 408 through the cellular network.

Referring to reference number 1501, according to an embodiment, the electronic device 201 may be positioned inside the cargo box 1510. For example, the electronic device 201 may set a band to cover the whole cargo box 1510. According to an embodiment, the electronic device 201 may identify the cargo inside the cargo box 1510 and the outgoing cargo from the cargo box 1510 by scanning the cargo (e.g., the asset device 301) inside the cargo box 1510. According to an embodiment, the electronic device 201 may transmit information about the detected cargo to the server 408.

Referring to reference number 1502, according to an embodiment, the plurality of electronic devices 201 may be positioned in the cargo box 1510. For example, the exact location of the cargo inside the cargo box 1510 may be obtained using the plurality of electronic devices 201. According to an embodiment, the electronic device 201 may identify a path in which the cargo is moved in the cargo box 1510, and/or a path for taking out of the cargo. According to an embodiment, the electronic device 201 may transmit information about the detected cargo to the server 408.

Figure 16:
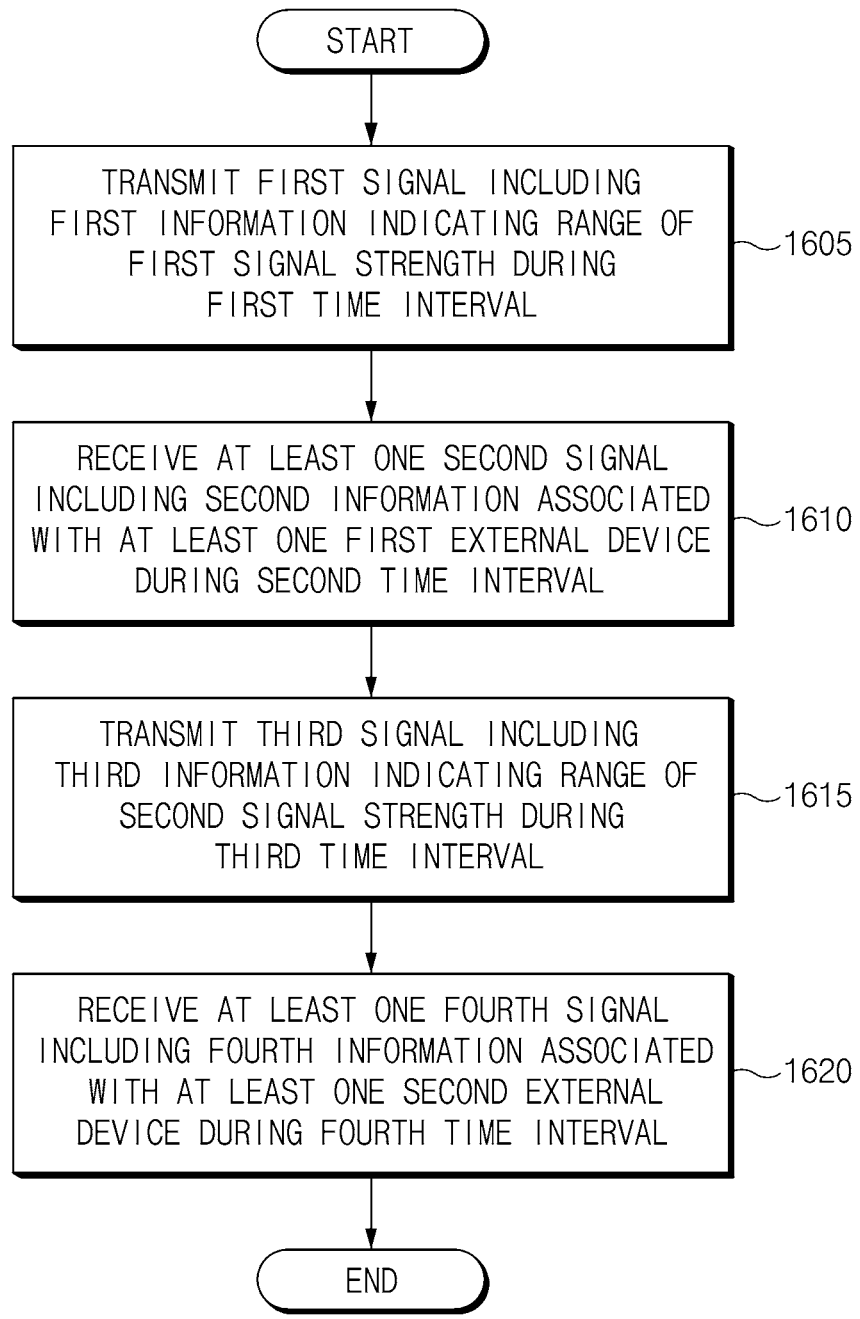
FIG. 16 is a flowchart of an asset device scanning method of an electronic device according to various embodiments.

FIG. 16 is a flowchart of an asset device scanning method of an electronic device according to various embodiments.

According to various embodiments, in operation 1605, the processor 220 (e.g., a control circuit) of the electronic device (e.g., the electronic device 201 in FIG. 2) may transmit a first signal including first information indicating the range of first signal strength during the first time interval, using the communication circuit 290. For example, the communication circuit 290 may be configured to transmit a wireless signal using BLE. For example, the first information may include a first maximum received signal strength indicator (RSSI) value and a first minimum RSSI value. For example, the first information may further include information associated with a response duration and/or first signal transmission power information.

According to various embodiments, in operation 1610, the processor 220 may receive at least one second signal including second information associated with at least one first external device 302 from at least one first external device (e.g., the asset device 302 of FIG. 3) during the second time interval, using the communication circuit 290.

According to various embodiments, in operation 1615, the processor 220 may transmit a third signal including third information indicating the range of second signal strength during the third time interval, using the communication circuit 290. For example, the third information may include a second maximum RSSI value different from the first maximum RSSI value and a second minimum RSSI value different from the second maximum RSSI value. For example, the third information may further include information associated with a response duration and/or third signal transmission power information. According to an embodiment, the first signal strength range and the second signal strength range may correspond to different signal strength ranges.

According to various embodiments, in operation 1620, the processor 220 may receive at least one fourth signal including fourth information associated with at least one second external device (e.g., the asset device 303) during the fourth time interval, using the communication circuit 290.

According to various embodiments, the processor 220 may be configured to transmit second information and fourth information to the server 408. According to an embodiment, the processor 220 may transmit the first signal and/or the third signal periodically or based on a user request.

Figure 17:
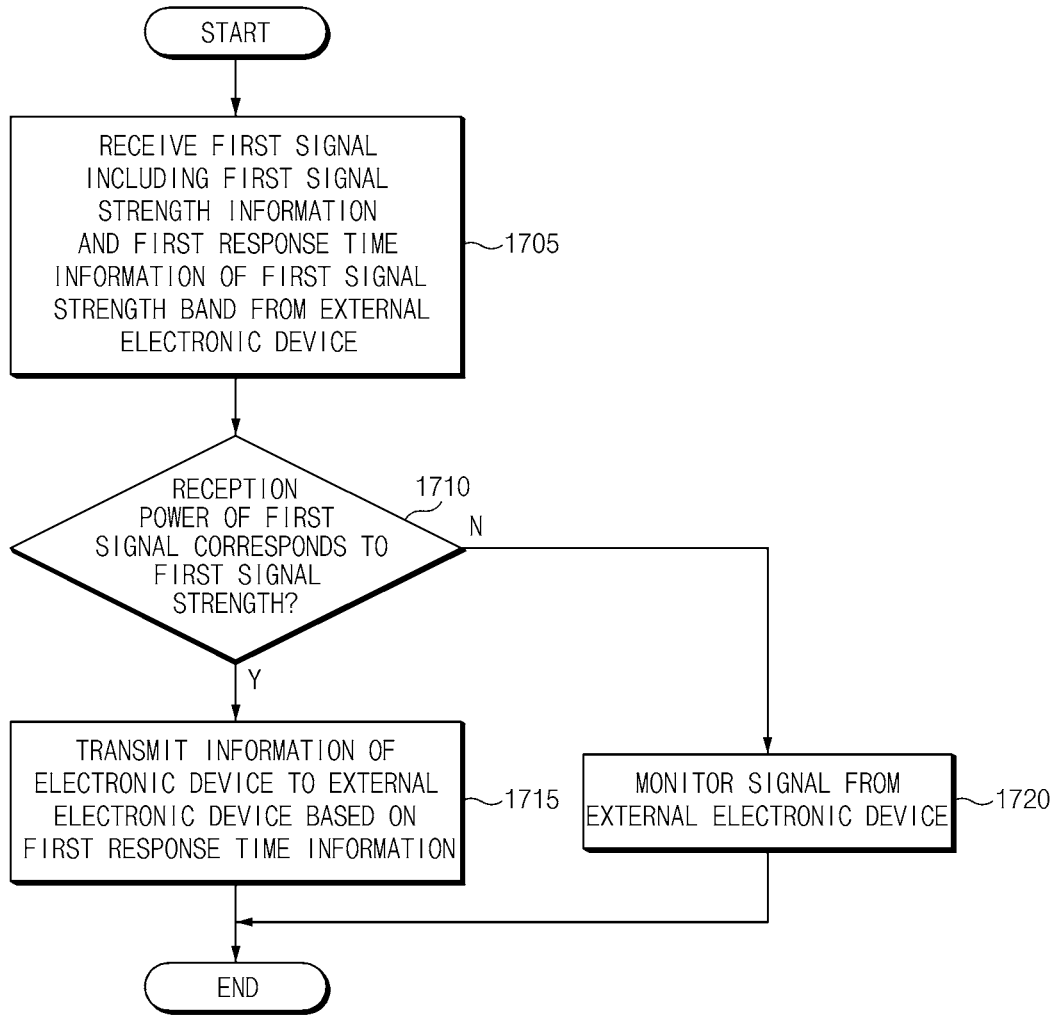
FIG. 17 is a flowchart of an information transmitting method of an electronic device according to various embodiments.

FIG. 17 is a flowchart of an information transmitting method of an electronic device according to various embodiments.

According to various embodiments, in operation 1705, the processor 320 of an electronic device (e.g., asset device 301 of FIG. 4, hereinafter, the electronic device 301) may receive a first signal including first signal strength information and first response time information of a first signal strength band from an external electronic device (e.g., the electronic device 201, hereinafter the external electronic device 201), using the communication circuit 390. For example, the communication circuit 390 may be configured to communicate with the external electronic device 201 using BLE communication.

According to various embodiments, in operation 1710, the processor 320 may determine whether the reception power of the first signal corresponds to the first signal strength. For example, the first signal may further include the transmission power information of the first signal. According to an embodiment, the processor 320 may determine whether the reception power of the first signal corresponds to the first signal strength information, based on the reception power and transmission power information of the first signal. For example, the first signal strength information may include a maximum value and a minimum value, and the maximum value and the minimum value may indicate an attenuation value for transmission power information.

According to various embodiments, in operation 1715, when the reception power of the first signal corresponds to the first signal strength, the processor 320 may transmit information of an electronic device to an external electronic device (e.g., the electronic device 201) based on first response time information, using the communication circuit 390.

According to various embodiments, in operation 1720, when the reception power of the first signal does not correspond to the first signal strength, the processor 320 may monitor a signal from the external electronic device 201, using the communication circuit 390. The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one communication circuit; and
   a processor configured to control the at least one communication circuit, wherein the processor is configured to:
   transmit a Bluetooth advertisement including first signal strength information indicating a first signal strength range and first response time information for the first signal strength range to cause at least one external electronic device, when a received power for the Bluetooth advertisement belongs to the first signal strength range, to transmit at least one response during a first response time interval indicated by the first response time information; and
   receive, from at least one first external electronic device, at least one response, the at least one response including information of the at least one first external electronic device corresponding to the first signal strength information, using the at least one communication circuit.

2. The electronic device of claim 1, wherein the Bluetooth advertisement further includes transmission power information of the Bluetooth advertisement.

3. The electronic device of claim 1, wherein the first signal strength range is selected from a plurality of signal strength ranges, which are different signal strength ranges from one another.

4. The electronic device of claim 3, wherein each of the plurality of signal strength ranges is defined based on maximum received signal strength and minimum received signal strength.

5. The electronic device of claim 1, wherein the processor is configured to:
   transmit the information of the at least one first external electronic device to an external server, using the at least one communication circuit.

6. The electronic device of claim 1, wherein the processor is configured to:
   transmit the Bluetooth advertisement based on a specified period or a user input.

7. The electronic device of claim 1, wherein the at least one response is received during the first response time interval corresponding to the first response time information.

8. The electronic device of claim 1, wherein the Bluetooth advertisement further includes a service identifier indicating that the Bluetooth advertisement includes the first signal strength information and the first response time information.

9. The electronic device of claim 1, wherein the Bluetooth advertisement further includes an identifier of the electronic device.

10. An electronic device comprising:
    at least one communication circuit; and
    a processor configured to control the at least one communication circuit, wherein the processor is configured to:
    receive a first signal including first signal strength information and first response time information of a first signal strength band from an external electronic device, using the at least one communication circuit;
    determine whether reception power of the first signal corresponds to the first signal strength information; and
    when the reception power of the first signal corresponds to the first signal strength information, transmit information of the electronic device to the external electronic device based on the first response time information.

11. The electronic device of claim 10, wherein the first signal further includes transmission power information of the first signal,
    wherein the processor is configured to:
    determine whether the reception power of the first signal corresponds to the first signal strength information, based on the reception power and the transmission power information of the first signal.

12. The electronic device of claim 11, wherein the first signal strength information includes a maximum value and a minimum value, and
    wherein the maximum value and the minimum value indicate an attenuation value for the transmission power information.

13. The electronic device of claim 10, wherein the at least one communication circuit is configured to communicate with the external electronic device, using Bluetooth low energy (BLE) communication.

14. The electronic device of claim 10, wherein the processor is configured to:
    when the reception power of the first signal does not correspond to the first signal strength information, monitor a signal from the external electronic device, using the at least one communication circuit.

* * * * *